United States Patent
Cambou et al.

(10) Patent No.: US 11,799,674 B2
(45) Date of Patent: Oct. 24, 2023

(54) ERROR CORRECTING SCHEMES FOR KEYLESS ENCRYPTION

(71) Applicant: Arizona Board of Regents on Behalf of Northern Arizona University, Flagstaff, AZ (US)

(72) Inventors: Bertrand F Cambou, Flagstaff, AZ (US); Fatemeh Afghah, Flagstaff, AZ (US); Sareh Assiri, Flagstaff, AZ (US); Ashwija Korenda, Flagstaff, AZ (US)

(73) Assignee: ARIZONA BOARD OF REGENTS ON BEHALF OF NORTHERN ARIZONA UNVERSITY, Flagstaff, AZ (US)

(*) Notice: Subject to any disclaimer, the term of this patent is extended or adjusted under 35 U.S.C. 154(b) by 186 days.

(21) Appl. No.: 17/542,118

(22) Filed: Dec. 3, 2021

(65) Prior Publication Data
US 2022/0217003 A1    Jul. 7, 2022

Related U.S. Application Data

(60) Provisional application No. 63/121,604, filed on Dec. 4, 2020.

(51) Int. Cl.
*H04L 9/32* (2006.01)
*H04L 9/08* (2006.01)

(52) U.S. Cl.
CPC .......... *H04L 9/3278* (2013.01); *H04L 9/0869* (2013.01); *H04L 9/3242* (2013.01)

(58) Field of Classification Search
CPC ... H04L 9/3278; H04L 9/0869; H04L 9/3242; H04L 2209/34; H04L 9/3239; H04L 9/32; H04L 9/08
See application file for complete search history.

(56) References Cited

U.S. PATENT DOCUMENTS

| | | |
|---|---|---|
| 8,782,396 B2 | 7/2014 | Ziola et al. |
| 2016/0156474 A1 | 6/2016 | Lee et al. |
| 2018/0129801 A1 | 5/2018 | Cambou |
| 2019/0207758 A1 | 7/2019 | Cambou |
| 2020/0169423 A1 | 5/2020 | Cambou et al. |

(Continued)

OTHER PUBLICATIONS

B. Cambou, "Unequally Powered Cryptography With PUFs for Networks of IoTs," IEEE Spring Simulation Conference, 2019.

(Continued)

*Primary Examiner* — Quazi Farooqui
(74) *Attorney, Agent, or Firm* — Quarles & Brady LLP

(57) ABSTRACT

Systems and methods of correcting errors in encrypted communication between a server and client devices using keyless encryption schemes are disclosed. Client devices with arrays of physical-unclonable-function devices respond to challenges from a server. Characteristics of the arrays are stored by the server during a secure enrollment process. To send an encrypted message, the server generates a message digest, extracts data from the stored arrays on the basis of the message digest, applies error correction codes to the message, encrypts the message with the extracted data, and sends the message to a client. The server may receive a handshake containing all or part of the message digest, measures its PUF, and decrypts and decodes the message.

19 Claims, 14 Drawing Sheets

(56) References Cited

U.S. PATENT DOCUMENTS

2021/0409233 A1* 12/2021 Lu .................... G06F 21/75
2022/0006653 A1* 1/2022 Ghetie ................ G06F 21/575

OTHER PUBLICATIONS

B. Cambou et al., "Response-Based Cryptographic Methods with Ternary Physical Unclonable Functions"; 2019 SAI FICC, IEEE, 2019.

B. Cambou et al., "Ternary Computing to Strengthen Cybersecurity, Development of Ternary State based Public Key Exchange", 2018 SAI Computing Conference, IEEE 2018.

Y. Zhu et al., "Extended Protocol Using Keyless Encryption Based on Memristors," In Science and Information Conference, pp. 494-510. Springer, Cham, 2020.

S. Assiri et al., "Software Implementation of a Sram Puf-Based Password Manager," in Science and Information Conference, Springer, pp. 361-379, 2020.

A. R. Korenda et al., "A Proof Of Concept Sram-Based Physically Unclonable Function (Puf) Key Generation Mechanism For IOT Devices," in 2019 16th Annual IEEE International Conference on Sensing, Communication, and Networking (SECON), pp. 1-8, 2019.

A. R. Korenda, et al., "A Secret Key Generation Scheme for Internet of Things Using Ternary-States Reram-Based Physical Unclonable Functions," in 2018 14th International Wireless Communications Mobile Computing Conference (IWCMC), pp. 1261-1266, 2018.

J. Delvaux et al., "Efficient Fuzzy Extraction of PUF-Induced Secrets: Theory and Applications," in International Conference on Cryptographic Hardware and Embedded Systems. Springer, pp. 412-431, 2016.

M. Taniguchi et al., "A Stable Key Generation from Puf Responses With A Fuzzy Extractor For Cryptographic Authentications," in Consumer Electronics (GCCE), 2013 IEEE 2nd Global Conference on. IEEE, pp. 525-527, 2013.

D. Merli et al., "Protecting PUF Error Correction by Codeword Masking," IACR Cryptol. ePrint Arch. 2013 (2013).

P. Kocher et al., "Introduction To Differential Power Analysis," Journal of Cryptographic Engineering, vol. 1, pp. 5-27, 2011.

M. Yu et al., "Secure and Robust Error Correction for Physical Unclonable Functions," IEEE Design Test of Computers, vol. 27, No. 1, pp. 48-65, 2010.

K. Kursawe et al., "Reconfigurable Physical Unclonable Functions-Enabling Technology for Tamper-Resistant Storage," in Hardware-Oriented Security and Trust, 2009. HOST'09. IEEE International Workshop on. IEEE, pp. 22-29, 2009.

G. E. Suh et al., "Physical Unclonable Functions for Device Authentication and Secret Key Generation," in Proceedings of the 44th annual design automation conference. ACM, pp. 9-14, 2007.

D. Lim et al "Extracting Secret Keys from Integrated Circuits," IEEE Transactions on Very Large Scale Integration (VLSI) Systems, vol. 13, No. 10, pp. 1200-1205, 2005.

L. Chua, "Memristor—The Missing Circuit Element," IEEE Transactions on Circuit Theory, vol. 18, No. 5, pp. 507-519, 1971.

J. Kim et al., "Predictive Analysis of 3d Reram-based PUF for Securing the Internet of Things," In 2018 IEEE Region Ten Symposium (Tensymp). IEEE, pp. 91-94, 2018.

H. Kang et al., "Performance Analysis for PUF Data Using Fuzzy Extractor," In Ubiquitous Information Technologies and Applications. Springer, pp. 277-284, 2014.

B. Škoric et al., "Robust Key Extraction from Physical Uncloneable Functions," In International Conference on Applied Cryptography and Network Security. Springer, pp. 407-422, 2005.

* cited by examiner

ERROR CORRECTING SCHEMES FOR KEYLESS ENCRYPTION

CROSS-REFERENCE TO RELATED APPLICATIONS

The present application claims priority to U.S. Provisional Application 63/121,604 entitled "ERROR CORRECTING SCHEMES FOR KEYLESS ENCRYPTION" and filed on Dec. 4, 2020, the entirety of which is incorporated herein by reference.

STATEMENT REGARDING FEDERALLY SUPPORTED RESEARCH

The subject matter of this disclosure was supported by the United States Government under Grant No. 1827753 awarded by the National Science Foundation and under Grant No. A8750-19-2-0503 awarded by the Air Force Research Laboratory. The Government may have certain rights herein.

BACKGROUND OF THE INVENTION

Information is frequently encrypted to protect against eavesdropping and unauthorized access. Many encryption schemes involve the use of one or more encryption keys, while others use keyless encryption schemes. Encryption schemes are frequently used in conjunction with authentication schemes to improve the security of electronic systems.

Physical unclonable functions (PUFs) are becoming increasingly popular as a security primitives and are used in various security applications such as identification, authentication, generation of cryptographic keys, and generation of random numbers. PUF-based security systems use a PUF device as an "electronic fingerprint" unique to a user or device in possession or control of the PUF device. Various types of PUFs have been recently utilized in security applications as ring oscillators, memory structures, SRAM, DRAM, Flash, ReRAM, and MRAM.

The output of a PUF, referred to as the response to a specific input challenge, is unclonable, random, but generally repeatable when the PUF is provided the same input challenge. Generally, a pair of PUF responses is used for encrypted communication between two devices (e.g., a client-server pair). In some systems, one device (e.g., a user's client device) contains the PUF itself, and the other device (e.g., a central server device) contains an image of the PUF, which is data regarding the PUF's previously generated responses that are stored during an enrollment phase for the client device. As used herein, the PUF responses generated initially from the PUF during the enrollment is called the original response, whereas the responses generated during access control, encryption or authentication rounds are simply referred as responses. In such systems, a server device can issue a challenge a client seeking authentication, receive a response generated by the client using a PUF device, and then compare the received with a stored response previously received from the client or derived from characteristics of the PUF device and verifying that the two responses match. PUF devices (i.e., devices in possession of the PUF or its image) may also be used to generate encryption keys for use with various encryption schemes.

Secure communication using PUF based encryption methods require correspondence between the original responses and the responses (i.e., matching between the PUF image and the PUF responses). However, the PUF responses are subject to variability or drift relative to the original response due to natural effects such as aging, temperature changes, bias voltages drifts, or electrostatic interference. According to some correction methods, if a PUF does not provide enough accuracy, the error rate can be reduced by taking out unreliable PUF bits through a process referred to as dark bit masking. It has also been suggested to use a codeword masking scheme to protect key generation algorithms used for PUFs. This proposed method enables masking of linear ECC without an impact on their error correction capabilities while keeping the overhead low. Also, helper data consisting of a code-offset between the secret PUF bits can be used, and an ECC codeword is then generated during the enrollment phase. This helper data is later used for reliable reconstruction of the initial key. To the best of knowledge, all these previous approaches focused on encryption of data using keys generated from PUFs. Error correction schemes for keyless PUF-based encryption is needed. Moreover, in conventional methods where helper data is transmitted between the communicating parties, because the helper data is transmitted separately from the encryption message, it may be intercepted, which may make an attack on the security of the system easier.

Most cryptographic schemes use keys to encrypt the message. These schemes are accompanied with key generation, key distribution, and storage of these keys, which leads to increased complexity in power-constrained networks. These requirements would be particularly challenging for Internet of Things (IoT) networks which consists of billions of nodes, some with very low power. Keyless encryption is attractive for low-power IoT devices with limited memory, as it eliminates the need to store keys, as well as the need for the generation and distribution of billions of secret keys among these devices. As the need for keys to encrypt messages is eliminated, the problems related to scalability of keys in key-based methods are automatically mitigated.

BRIEF SUMMARY

Exemplary embodiments are directed to improvements in keyless cryptography using PUF-based encryption. In certain embodiments, a keyless encryption protocol using memristors as PUFs is disclosed, based on the idea that the injection of low currents in cells of memristor arrays can result in ephemeral conductive paths and stochastic resistances. In this protocol, the plaintext is integrated as a part of resistance values obtained from the memristor PUF at a particular cell address, where a certain current is injected to create a cipher text. However, the memristor PUFs are subjected to variations in resistance measurements due to the natural drifts of physical parameters with time and environmental conditions (e.g., temperature) which make the keyless encryption protocol challenging.

Exemplary embodiments include an error correction mechanism to facilitate the operation of such keyless encryption by correcting a portion of the errors caused by the noise in PUF responses. Exemplary embodiments are directed to an improved protocol for keyless encryption, which uses error correction codes (ECC), e.g., parity bits, encoded into plaintext message fragments prior to encryption. The encoded fragments are then encrypted, using measured PUF response data or retrieved PUF image data, and transmitted. The blocks are decrypted by the receiving device, again using measured PUF response data or PUF image data, and the decrypted, encoded blocks are decoded by applying the appropriate ECC decoding routine. The results show that, without the inclusion of ECC blocks, the decrypted message contains errors. This proposed protocol has allowed proper decryption of message when the noise is in the range of its correction capability. Even when the noise is more than the ECC block can correct, the resulting message contain less errors than the one resulting from the noisy PUF.

Inventive embodiments include both methods for engaging in encryption communication, and in computer based systems having programmable microprocessors executing computer instructions operable to cause the processors to carry out steps of the method. In one aspect, a system is described having a processor, and memory coupled to the processor, the memory storing device characteristics of a physical-unclonable-function ("PUF") array belonging to a client device and having a plurality of PUF devices, each device characteristic associated with a physical measurement of a PUF device belonging to the PUF array. The memory also stores executable instructions that, when executed by the processor, cause the processor to receive a message and processing instructions, extract a set of addresses and a set of corresponding sequence values from the processing instructions; and generate a transformed string. The transformed string is generated by dividing the message into message fragments and associating each message fragment with an address and its corresponding sequence value. The processor encodes each message fragment with error correction codes resulting in encoded message fragments. For each encoded message fragment, the processor retrieves, from the memory, a corresponding device characteristic identified by the associated address, generates transformed fragments representing each message fragment with a value determined by a function of the value of that message fragment and the corresponding device characteristic, and concatenates the transformed fragments in an order derived from the set of corresponding sequence values.

In another aspect, a system is described including a processor, a physical-unclonable-function ("PUF") array of PUF devices, and memory coupled to the processor. The memory stores instructions that, upon execution by the processor, cause the processor to: receive deciphering instructions and a ciphertext, extract, from the deciphering instructions, a set of addresses and a corresponding set of sequence values, divide the ciphertext into ciphertext fragments, each ciphertext fragment associated with an associated address and an associated sequence value, each associated address identifying a PUF device belonging to the PUF array, retrieve a plaintext by performing a deciphering procedure. The deciphering procedure includes: measuring, for each ciphertext fragment, a characteristic of the associated PUF device for that ciphertext fragment identified by the associated address for that ciphertext fragment, deriving, for each ciphertext fragment, a decrypted fragment for using the measured characteristic of the associated PUF device, applying an error correction code decoding procedure to each of the decrypted fragments resulting in decoded fragments; and concatenating the decoded fragments in an order derived from the corresponding set of sequence values extracted from the deciphering instructions.

In another aspect, a system is described having a processor, a physical-unclonable-function ("PUF") array of PUF devices, and memory coupled to the processor. The memory stores instructions that, upon execution by the processor, cause the processor to receive a message and processing instructions, extract a set of addresses and a set of corresponding sequence values from the processing instructions; and generate a transformed string. The transformed string is generated by dividing the message into message fragments and associating each message fragment with an address and its corresponding sequence value, encoding each message fragment with error correction codes resulting in encoded message fragments, and for each encoded message fragment, identifying and measuring a corresponding device characteristic of a device in the array of PUF devices having the corresponding address. The processor also generates transformed fragments representing each message fragment with a value determined by a function of the value of that message fragment and the corresponding device characteristic and concatenates the transformed fragments in an order derived from the set of corresponding sequence values.

Inventive embodiments have certain advantages. Keyless encryption is generally advantageous because it obviates the need for key generation, transmission and storage. There has been an increase in side channel attacks based on analyzing the differential power dissipated in cryptography to extract keys. This type of attack is very practical and non-invasive, allowing the hackers to extract the keys by analyzing the differential power. As IoT devices have a limitation on power and memory for most devices, it is harder to implement complex schemes using long secret keys and strong cryptographic schemes. Therefore, keyless encryption has the potential to be a safer encryption method for IoTs.

Moreover, the avoidance of key transmission is particularly advantageous because keys may be intercepted by hostile actors during transmission. Additionally, inventive embodiments are resistant to other side channel attacks, which are more likely to succeed when encryption keys are retrieved from device memory and employed to encrypt or decrypt messages.

Additionally, by including ECC codes in the message itself as part of a keyless encryption scheme, inventive embodiments avoid the problem of noisy PUF response data being used to generate corrupt encryption keys. In traditional cryptography the distribution of the keys through KEM is a problem, as a single bad bit can make the key useless. Using ECC directly in connection with key generation is generally not helpful since the keys are large, and appropriately powerful ECC algorithms for such large messages will generally require long data helpers. In inventive embodiments, this problem is avoided by encoding small message fragments, which requires correspondingly small numbers of helper (i.e., parity) bits, which reduces processing and storage overhead.

Thus, inventive embodiments enable a keyless memristor PUF-based encryption that is insensitive to drift or noise in the PUF measurements. These improved protocols have been tested with noisy responses of memristor-based PUFs and Applicants have demonstrate the successful decryption of the encoded message. The above and additional advantages features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
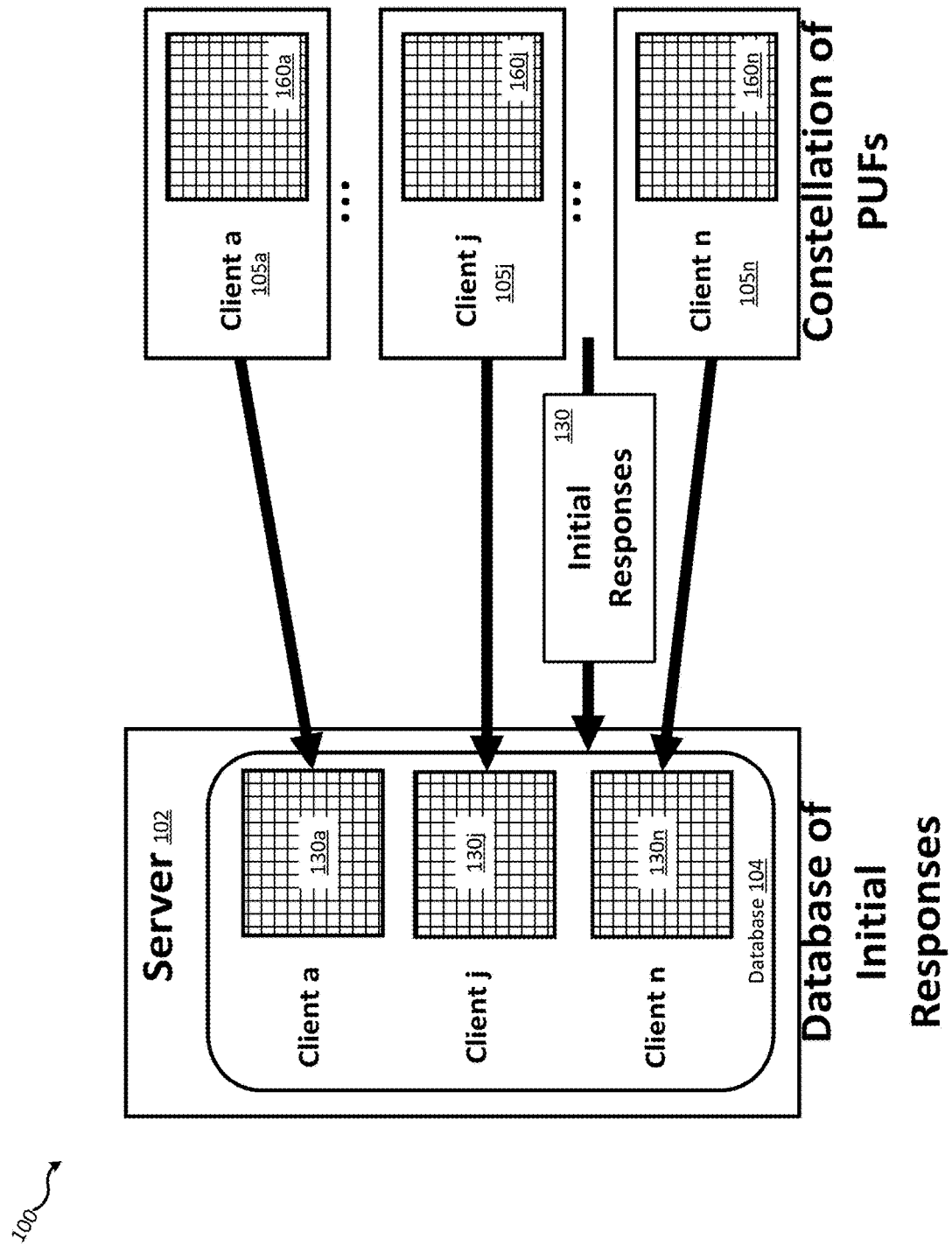
FIG. 1 depicts an enrollment procedure wherein a server issues challenges to clients having PUF arrays and stores responses to those challenges for use in subsequent authentication of the clients, according to one embodiment.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional systems and methods for secure communication frequently rely upon encryption of messages using encryption keys which may be symmetrical or asymmetrical (e.g., in public key encryption schemes). Such key-based encryption schemes have disadvantages. First keys must be generated and stored by various parties, introducing the possibility that the keys may be compromised by a malicious party. Additionally, key-based encryption schemes may be vulnerable to brute force attacks wherein a malicious party may discover the key given access to a message encrypted with that key.

Accordingly, embodiments disclosed herein address these and other shortcomings by using physical unclonable function (PUF) generators (APGs) and applying error correction codes to implement a keyless encryption scheme where a client with a APG and a server with knowledge of device characteristics of the APG communicate using a variable cipher.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same challenge should be similar to each other (and preferably identical).

Additional non-limiting examples of non-limiting examples of measurable physical characteristics of devices used in PUF arrays are currents induced by an applied input voltage or current, voltages of various circuit elements during operation of a PUF device in response to an input or other stimulus. Further non-limiting examples may include derived quantities such as resistance, conductance, capacitance, inductance, and so on. In certain embodiments, such characteristics of a device may be functions of an input or stimulus level of the device. For example, a current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus the relationship between applied current and voltage measured across a memristor (or between applied voltage and current measured through the memristor) is one example of a non-linear transfer function which can be exploited to produce multiple discrete or continuous characteristic values using a single PUF device.

In certain embodiments, the keyless, error corrected encryption schemes described below use Memristor PUFs, although this should not be considered limiting. A memristor acts as a circuit element that operates as both a memory and a transistor. The device is initialized or formed by a passing a short burst of high current through the device, which forms a network of conductive filaments. These filaments can be broken or reformed to set the memory state of the device in either a high or low resistance state. One example of a memristor based device is the Resistive Random-Access Memory (ReRAM). The ReRAM has shown great potential as one of the most efficient memory technologies with the unique features such as high density, low-power, and non-volatility.

ReRAM devices can be used as PUFs because the current-voltage characteristics of individual ReRAM cells vary and are non-linear. Thus, the measured resistance of a memristor will depend on a current or voltage level applied during the measurement process. Thus the relationship between applied current and voltage measured across a memristor (or between applied voltage and current measured through the memristor) is one example of a non-linear transfer function which can be exploited to produce multiple discrete or continuous characteristic values using a single PUF device. Indeed, because the I-V characteristics of memristors are non-linear, a memristor array provides a near infinite space of discrete, but repeatable, physical characteristic measurements that can form the basis of the key generation techniques described herein. The randomness and the stability of ReRAM PUFs have been measured and demonstrate the significant robustness of the ReRAM PUF against spatial-temporal variations (close to 50%). The use of ReRAM based APGs is described generally in co-pending U.S. patent application Ser. No. 17/221,180, published on Oct. 7, 2021, which is incorporated herein in its entirety.

According to various embodiments, an encryption protocol enabled by PUFs includes the following stages: (1) Enrollment, (2) Handshaking, (3) Ciphertext generation, and (4) Ciphertext Decryption. In the improved keyless encryption arrangements described below, the ciphertext generation step includes a pre-processing step where ECC such as an error control block is appended to a message, or to fragments thereof, prior to encryption. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The server 102 manages a database 104 which may be stored in memory of the server 102. The database 104 stores characteristics of the PUF arrays 160 of each client (i.e., "images" of each PUF array 160), which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. Alternatively, the server 102 may be otherwise provided with information suitable to generate the initial challenge responses 130.

A PUF array 160 may form parts of an addressable PUF generator (APG), described further below, which may contain additional processing circuitry and execute instructions for generating challenge responses. Enrollment is performed for each client 105 in a secure environment. After enrollment, the constellation of clients 105 may operate in an insecure environment and communicate with each other over public networks. Secure information needs to be encrypted.

Figure 2:
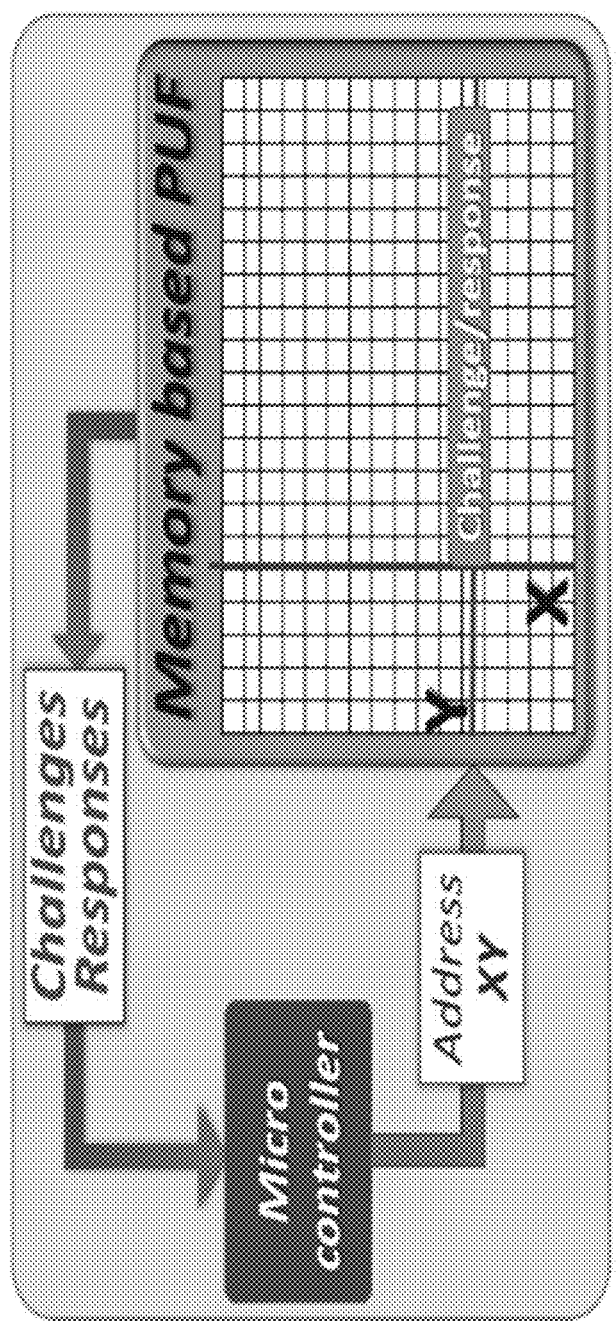
FIG. 2 is a block diagram schematically illustrating an enrollment procedure in additional detail.

As stated above, inventive embodiments make use of one or more of addressable PUF generators (APG) to generate PUF responses, which are compared, or are used to generate data that is compared, to previously generated responses that are elicited and stored during an enrollment process. Such a process is schematically illustrated in FIG. 2, which schematically illustrates an APG with an addressable PUF. As shown in FIG. 2, a PUF challenge is generated, e.g., a set of address values 'x' and 'y'. The challenge may additional specify measurement conditions under which the response is to be generated. In the case of a ReRAM PUF, this may include current levels being used to measure cell resistance. The challenge is passed to the APG with locates the corresponding address in the PUF. The PUF's response for the received challenge is generated, and may be passed to another device, or may generate a message digest that is passed to another device, where it is compared to a response generated by examining the corresponding address of a PUF image. In a keyless encryption arrangement, the same PUF challenges at both devices (e.g., a communicating client device and a server device) are generated in parallel, so that the same responses can be retrieved from both the PUF and the previously stored PUF image. In one example, this is accomplished by generating the challenge with a shared (e.g., known by both parties in advance) password and a random number that is shared or independently generated by both parties. In one embodiment, a client and server device may each have a clock-synchronized random number generator, each of which generates the same random number at the same or nearly the same time. In other embodiments, the random number is shared between the server and client using handshake mechanisms and the password is already known to both the client and server. Therefore, this allows both parties to arrive at the same PUF address. From that particular cell address, the required number of PUF bits can be extracted. The value of the cell's response is a function of the PUF type. For example, the response of SRAM cells are binary digits, whereas ReRAM cells gives resistance values.

Inventive embodiments are directed keyless encryption using APGs, which in turn, use arrays of Memristors as PUFs. Interest in developing encryption techniques without using keys is rising. The advantage of keyless encryption techniques, shared by the inventive embodiments described below, is that the distribution, generation, and storage of data analogous to encryption keys is all internal to the communicating devices. This obviates certain attack paths usable against key-based encryption. Targeting key extraction is a common attack in key-based cryptographic methods, for example, attacks based on differential power analysis. This kind of attack is practical and non-invasive; the information is leaked to hackers by analyzing power consumption to extract secret keys from a wide range of devices. The keyless protocols described below eliminate the need to generate and store cryptographic keys and can mitigate attacks based on differential power analysis.

Inventive embodiments described below employ memristor PUF-based keyless encryption protocols. Under such methods, a message is directly encrypted using the modulation of currents driving ReRAM cells at low power. The main idea is that without the use of cryptographic keys, the plaintexts to be encrypted are cut into blocks and are directly converted into ciphers utilizing the features of memristor arrays. This protocol uses multi-factor authentication and approaches like APGs to extract PUF response which is integrated with the plaintext to generate a cipher text. Suitable memristor and ReRAM-based keyless encryption arrangements improvable with the additional error correction schemes described herein are disclosed in co-pending U.S. patent application Ser. No. 16/724,739, published on Jul. 2, 2022, which is incorporated herein by reference in its entirety.

Figure 3:
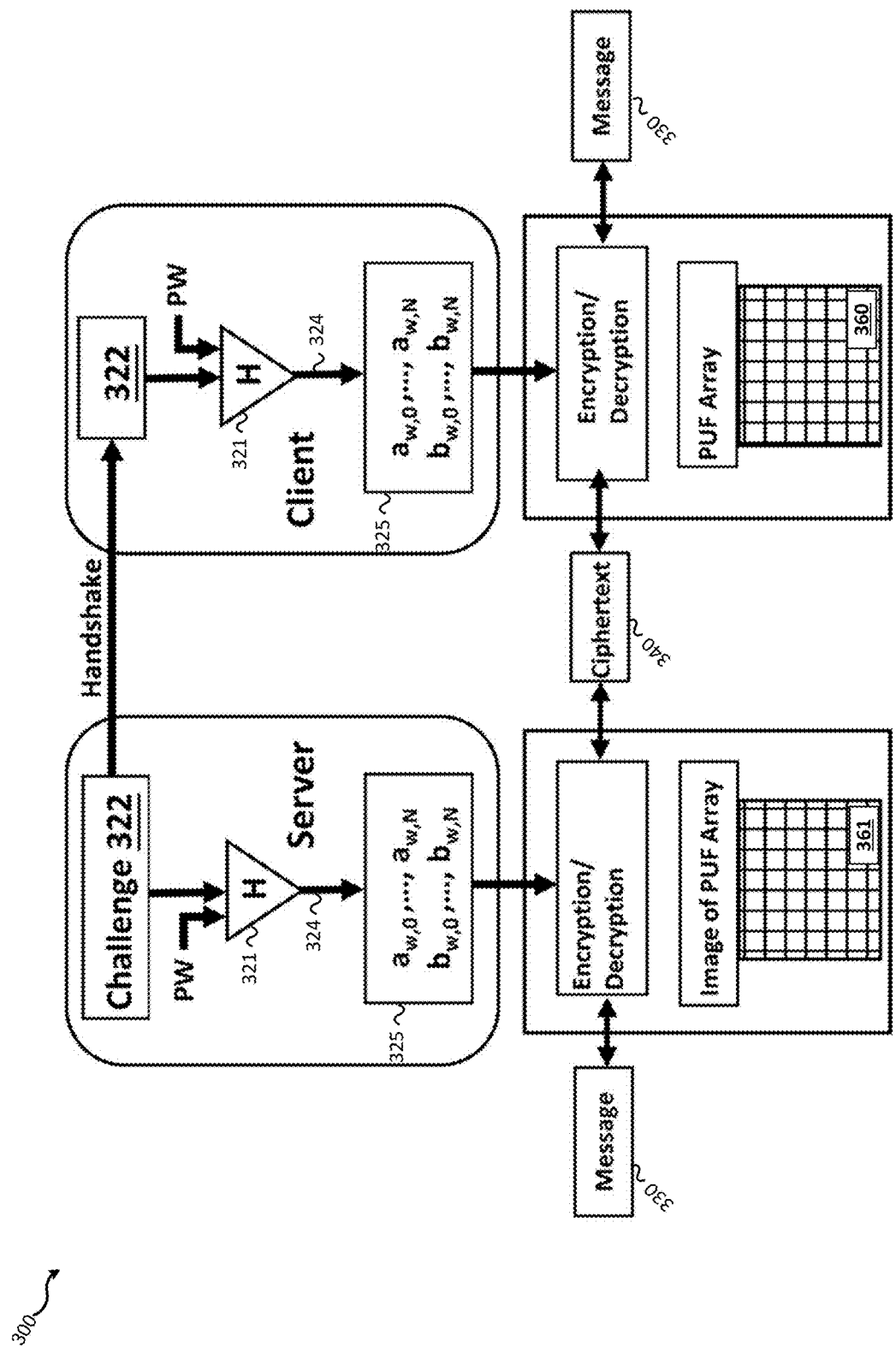
FIG. 3 is a block diagram of a client device with an addressable PUF generator (APGs), interacting with a server using a keyless PUF-enabled encryption scheme.

FIG. 3 shows an example embodiment 300 in which a server 302 communicates securely with a client 305 using a keyless encryption scheme enabled by the use of PUFs according to an embodiment. In this scheme, the server 302 stores an image 361 of a PUF array 360 belonging to (or otherwise controlled by or associated with) the client 305. In the embodiment shown, the server 302 issues a challenge 322 to the client 302. The challenge 322 may be converted into a message digest 324 generated from the challenge 322 using the hashing function 321, for example. Instructions 325 may be extracted from the message digest 324 by either the server 302 or the client 305, as appropriate. For example, the client 305 may use measurements of the PUF array 360 to generate a ciphertext 340 from a message 330 using the instructions 325, as described further below, and transmit the ciphertext 340 to the server 302. The server 302 may then decrypt the ciphertext 340 using device characteristics stored in the image 361 of the PUF array 360 using the instructions 325 to recover the message 330. The server 302 may also encrypt the message 330 using the image 361 of the PUF array 360 to form the ciphertext 340. In this instance, the client 302 may use the instructions extracted from the message digest 324 to recover the message 330. In some embodiments, the server 302 and client 305 may access a shared random number generator or have synchronized random number generators. In such embodiments, the challenge 322 may be a random number generated by the shared random number generator or independently generated by the server 302 and the client 305. In such embodiments, the server 302 may not need to send the challenge 322 to the client 305. In other embodiments, the client 305 may generate the ciphertext 340 and transmit the challenge to the server 302, thereby allowing the server to recover the message 330.

Images of addressable PUFs associated with client devices are stored by the server and contain data obtained during enrollment of the client devices as previously described. For use with keyless schemes such as the scheme represented by FIG. 3, the initial readings of the initial measurement of the PUF devices need to be comprehensive. For example, each device (or "cell") may characterized using as many as 1,000 successive measurements under different electrical conditions (e.g., with varying currents and voltages.) For example, in experiments performed by the inventors, the resistances of cells of memristor-based PUF arrays were measured 51 times at five different current levels: 10 nA, 50 nA, 100 nA, 200 nA, and 400 nA. For each cell, the average value of the resistance at each current was stored in a lookup table. An APG such as the APG 310 may also include additional circuitry to allow measurement of temperature at or near individual PUF devices. In such instances, a PUF image may also contain device characteristics measured at different temperatures or information from which the temperature-dependent behavior of device characteristics may be predicted.

The message digest 324 may be divided into a set of addresses $\{a_0 \ldots a_n\}$ that identify locations of particular PUF devices in the PUF array 360 (or locations of data associated with those devices in the image 361 of the PUF array 360) and a corresponding set of numbers $\{b_0 \ldots b_n\}$ or other sequencing information used to determine a sequence or ordering, as described further below. Generally, in certain embodiments, the client 305 may divide the message 330 into fragments and express those fragments as binary numbers. For each fragment, the client device may associate that fragment with one of the addresses and a corresponding number belonging to the sequencing information. The client device 305 may then access a PUF device belonging to the PUF array 360 at the address associated with that fragment and measure a characteristic of that PUF device. The client 305 may then encode each message fragment using a transformation based on a value of that message fragment (e.g., the binary representation of that message fragment) and the measured characteristic of the associated PUF device. Finally, the client 305 may concatenate the message fragments in a scrambled sequence determined using the set of sequencing numbers $\{b_0 \ldots b_n\}$, as described further below. Because only the server 302 and the client 305 can measure (or retrieve) characteristics of the PUF devices belonging to the PUF array 360, only the server 302 can decrypt messages encrypted by the client 305. Similarly, only the client 305 can decrypt messages encrypted by the client 302 using characteristics of the PUF array 360 of the client 305. For increased security, the message 330 may be segmented into multiple segments (i.e., blocks) and a new randomly generated challenge 322 may be used to determine the cipher scheme for each segment of the message 330. The number of addresses in the set of addresses and the set of sequencing numbers may also be adjusted to allow the encryption of messages of various lengths. Further details are discussed below.

In an example, the challenge 322 is used to generate the message digest 324 using a standard hashing function (experimental validation was performed using SHA-3, for example). Other suitable hashing functions are MDA, SHA-1, and SHA-2, as non-limiting examples. A message may be subdivided into multiple bitstreams, collectively used to form the addresses $\{a_0 \ldots a_n\}$ and "sequencing numbers" $\{b_0 \ldots b_n\}$. In some embodiments, it may be desirable to specify a large number of addresses (and/or a number of long address) and sequencing numbers using a single message digest derived from a single challenge 322. A method 400 of generating sets of addresses and sequencing numbers having many more bits than the message digest 324 is illustrated by FIG. 4.

Figure 4:
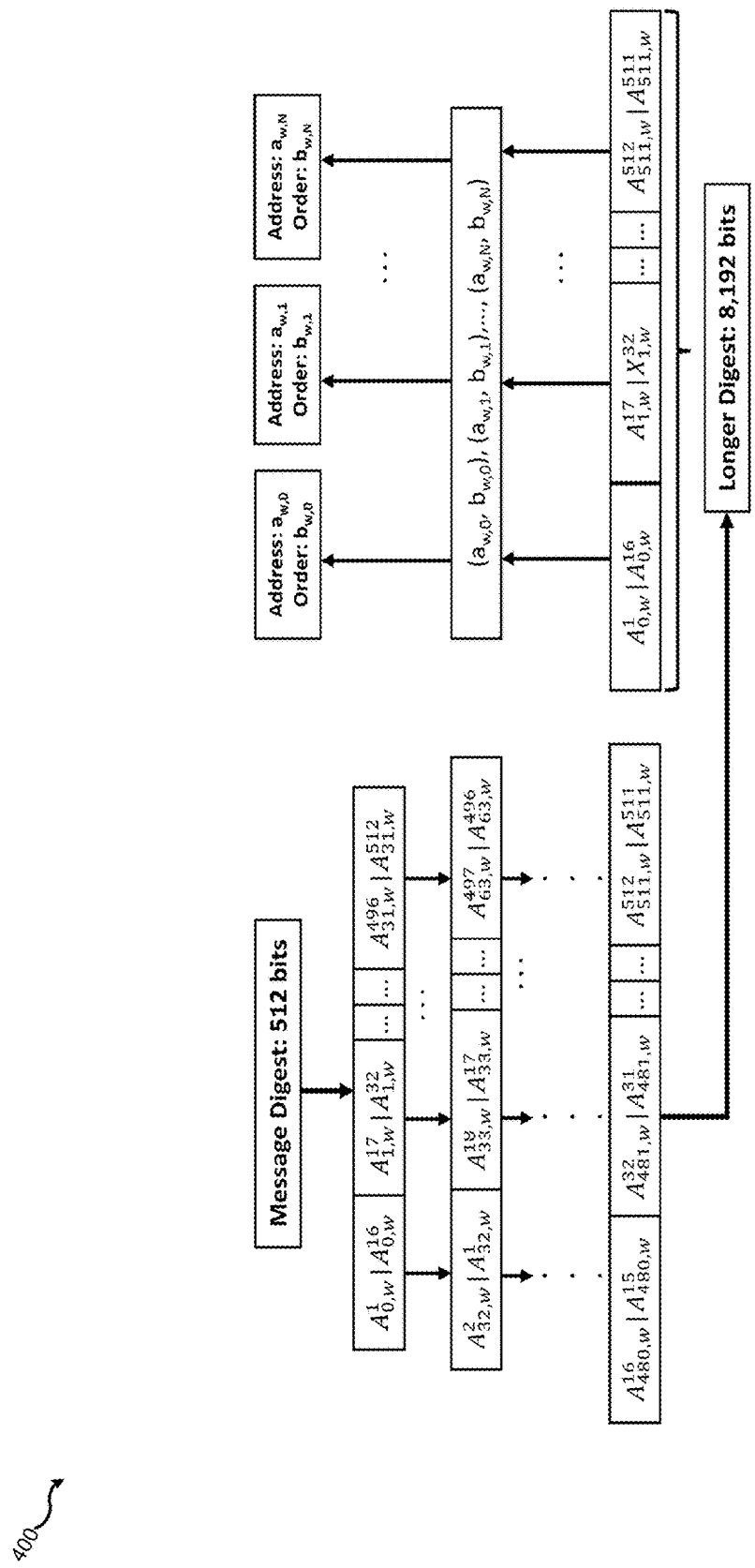
FIG. 4 is a schematic diagram illustrating a procedure used in certain embodiments when generating encryption instructions from a message digest.

As shown in FIG. 4, an SHA-3 message digest is 512 bits long. This digest may be used to derive instructions (e.g., the instructions 325) that are collectively much longer than 512 bits. First, the original message digest is segmented into 16-bit chunks. The bits of the message digest A are denoted by $A_i^k$, where the index i indicates which chunk the bit belongs to and the index k indicates the bit's overall position in the digest. Thus the first chunk (i=1) contains bits 1-16, the second chunk (i=2) contains bits 17-32, and so on until the final chunk (i=32), which contains bits 496-512:

$$|A_1^1 \ldots A_{1,}^{16}| \quad |A_2^{17} \ldots A_2^{32}| \quad \ldots \quad |A_{32}^{496} \ldots A_{32}^{512}|$$

As a non-limiting example, the original digest A may be expanded by concatenating additional unique strings generated by permuting the bits of the digest A in any acceptable manner. One such method comprises cyclically permuting bits belonging to the chunks in A, thereby shifting the position of each bit in a chunk one position to the left (or right). For instance, if a left cyclical permutation is used, a second bitstream (chunks 33-64) is formed having the arrangement:

$$|A_{33}^2 \ldots A_{33}^{16}|A_{33}^1| \quad |A_{34}^{18} \ldots A_{34}^{32}|A_{34}^{17}| \quad \ldots \quad |A_{64}^{497} \ldots A_{64}^{512}|A_{64}^{496}|$$

The cyclical permutation described above can be performed a total of 15 times before the original digest is reproduced. Thus, using this example method, a 512-bit digest can be transformed into in an 8,192-bit-long without duplication of the original 16-bit chunks by concatenating the original digest with 15 additional strings generated as described above.

If an example PUF array such as the PUF array 360 is a 2D array of 1024×1024 cells, there will be 1,048,576 addresses required to address each cell directly, required at least a 20-bit address length. If a block cipher using 256 PUF measurements is chosen, an 8,192-bit-long string can be used to provide 256 20-bit addresses along with the 8-bits required to provide a sequencing number with 256 possible values (i.e., an 8-bit number) corresponding to each address. It is not necessary that every address be unique, nor that every sequencing number be unique. In particular, a non-limiting simplified example of a procedure to accommodate repeated sequencing values within one block is as follows: (1) the sequencing numbers $\{b_0 \ldots b_n\}$ are ranked from smallest to highest value. (2) The lowest ranked number is assigned the first position in the sequence. (3) if duplicate numbers exist, the first duplicate encountered is assigned to the next available position and subsequent duplicate numbers are again assigned to the next available position in the sequence, as illustrated by the example below for a set of nine sequencing numbers. The index i indicates the order in which the numbers $b_i$ are encountered. $O_i$ indicates the position in the sequence assigned for that number $b_i$:

| i | 1 | 2 | 3 | 4 | 5 | 6 | 7 | 8 | 9 |
|---|---|---|---|---|---|---|---|---|---|
| $b_i$ | 5 | 3 | 8 | 4 | 5 | 6 | 8 | 5 | 7 |
| $O_i$ | 2 | 0 | 7 | 1 | 3 | 5 | 8 | 4 | 6 |

Figure 5:
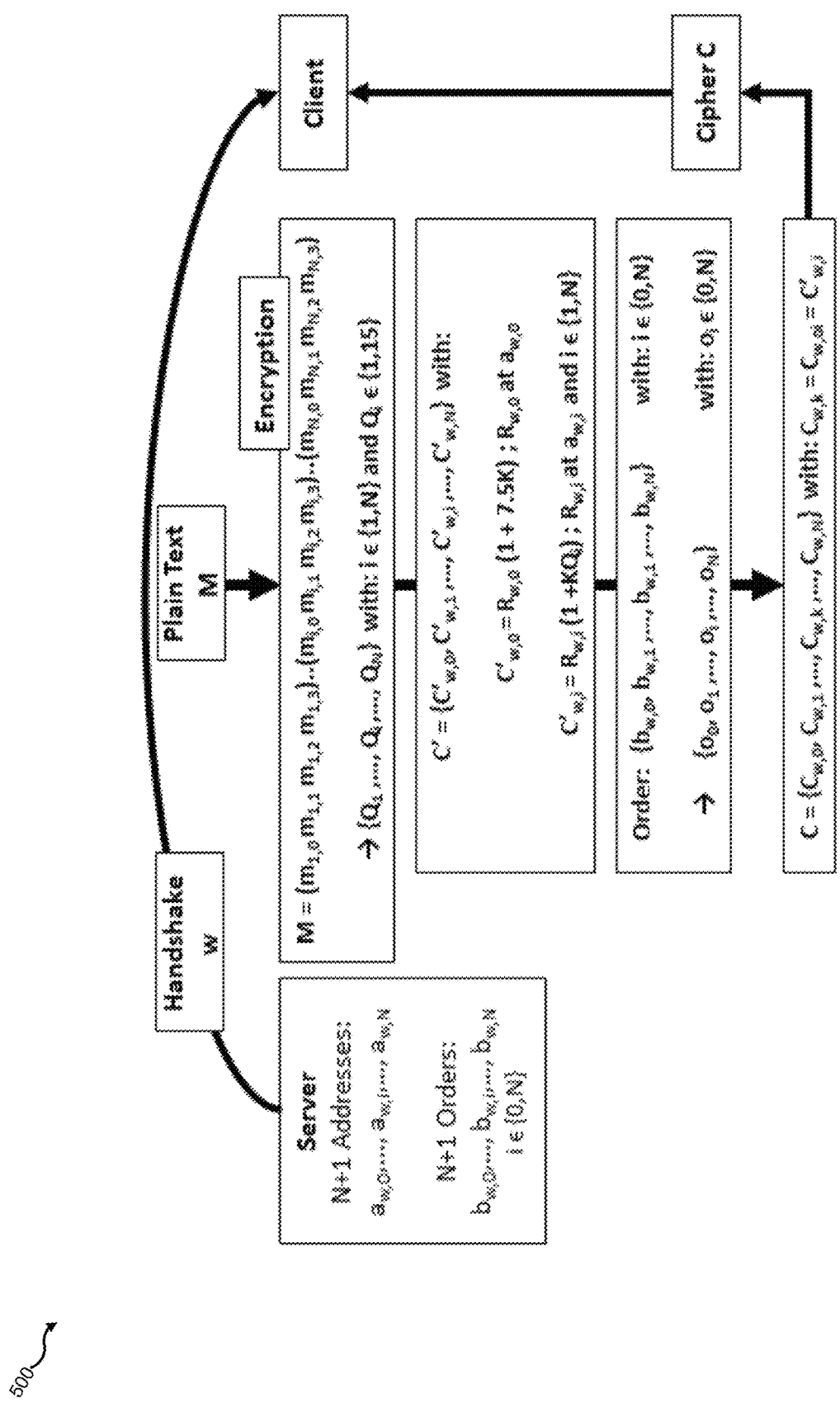
FIG. 5 is a flow diagram depicting an encryption procedure that may be practiced using the embodiment of FIG. 3.

FIG. 5 illustrates an example encryption procedure 500 according to certain embodiments. At this point of the scheme, N+1 addresses $(a_0, \ldots, a_n)$, and N+1 sequence values $(b_0, \ldots, b_n)$ that are re-ordered as $(O_0, \ldots, O_N)$, which have been independently generated by the server and the client device, are transmitted to their respective encryption/decryption modules. Various quantities are shown with the subscript w in FIG. 5 to indicate that they apply for a given Handshake w (i.e., a particular challenge sent as part of that Handshake communication). In some embodiments, a message is broken into multiple segments, each of which is encrypted and decrypting based on an additional challenge.

A message M (e.g., the message 330) to encrypt is a stream of 4×N bits that are fragmented into 4-bit message fragments. In this example, $M=(m_{1,0}|m_{1,1}|m_{1,2}|m|_{1,3}) \ldots (m_{i,0}|m_{i,1}|m_{i,2}|m_{i,3}) \ldots (m_{N,0}|m_{N,1}|m_{N,2}|m_{N,3})$. Each fragment (i.e., the i-th fragment) may be represented by a natural number $Q_i \in \{0, 15\}$ yielding a set of numbers $\{Q_1, \ldots Q_i, \ldots Q_N\}$ with $i \in \{1, N\}$. For each i-th message fragment the resistance $R_n$ may be read by the server (e.g., the server 302) from a look-up table (e.g., the image 361 of the PUF array 360), or measured by the client using the PUF array belonging to the client (e.g., the PUF array 360 of the client 305). The PUF device used to obtain $R_n$ is identified by the address $a_i$ associated with the i-th message fragment. Given the resistance values of the PUF devices associated with the message fragments, encoded message fragments C'' are computed as follows by measuring characteristics of the PUF devices wherein the measurement conditions of each measurement are determined by the corresponding message fragment value. For instance, each memristor of the PUF array may have been characterized at one of 16 input levels. Due to the nonlinear current-voltage characteristics of the memristors, each of the 16 input levels will produce a different resistance level when measured (in contrast to a conventional resistor which has constant resistance over an extremely wide range of measurement conditions). The variation in resistances between the individual memristor devices means that an attacker cannot determine the encoded scheme without access to the device characteristics.

First, a reference value $R_0$ is encoded as $C'_i$. This reference value is not related to the message itself and is instead used to calibrate the resistance values used to encode the message fragments. In this example, $C'_0=R_0(1+7.5K)$. $R_0$ is read at an address $a_0$ generated from the message digest as described above. The reason that the value is multiplied by (1+7.5K), is to make the result as neutral as possible when compared with the other values. On average all other values are also multiplied by the same factor, 7.5 as is the average value of $Q_i$, with values varying from 0 to 15. In this example, the parameter K can take arbitrary values typically from 0.2 to 2, as long as the communicating parties use the same number. The factor K may arbitrary number, large enough to differentiate the resulting $C'_i$ to minimize the error rate during decryption. K should be much larger than the intra-cell standard variation of the resistance measured at a given current/temperature. Intra-cell variations have been observed in the 0.1-1% range, so K=0.2 gives enough margin to design the encrypting device.

Next, values for the encoded message fragments are determined by $C'_i=R_i(1+K*Q_i)$ where $R_i$ is read at the address $a_i$ associated with each i-th message fragment. The resulting encoded data stream $C'=\{C'_0, C'_1, \ldots, C'_i, \ldots, C'_n\}$ is generated. In this particular example, a memristor-based PUF array is used and the message fragment values determine measurement conditions. For example, if $Q_i=0$, the resistance of the appropriate memristor may be measured at a minimum input current value whereas if $Q_i=15$, the highest input current value may be used. Due to the non-linear current-voltage transfer function of each memristor, the measured resistance will vary widely depending on the input current level used for the measurement.

Finally, the sequencing numbers are used to scramble the ordering of the encoded data C' as described above, yielding a ciphertext derived from the original message and measurements of the PUF array. The sequencing numbers are needed to finalize the encryption and permute the encoded fragments of C' into the final ordered ciphertext C according to the order $O=\{O_0, O_1, \ldots, O_i, \ldots, O_N\}$. Thus $C=\{C_0, C_1, \ldots, C_k, \ldots, C'_n\}$ where $C_k=C'_{O_i}=C'_i$ and $k\in\{0, N\}$. The block cipher has thereby been permuted by the orders generated by the message digests.

The encryption scheme described can be augmented with the use of additional nonce and random numbers to enhance entropy and make frequency analysis difficult. As non-limiting examples, randomly-generated strings or individual bits may be inserted at positions known to the sender and receiver. In some embodiments, such random information is included in the message prior to fragmentation and the random information is scrambled along with the original message data as described above. In such embodiments, just as certain fragments may be reserved for reference values (e.g., the reference resistance described above), certain fragments may be used for random information or other information. In some embodiments, error correction information may be included using similar methods (i.e., insertion at fixed locations in the message or resulting ciphertext, or at locations determined by instructions extracted from the message digest). The error correction information may include, as non-limiting examples, check bits, parity bits or other information generated and utilized according to suitable error-correcting codes or other error-correction schemes.

The table below is a simplified example of an encryption process according to one embodiment using a 32-bit long message for illustration. The message is fragmented into 8 4-bit message fragments corresponding to index values $i\in\{1,8\}$. As above, an additional fragment for the reference value described above is included (i=0).

| i | 0 | 1 | 2 | 3 | 4 | 5 | 6 | 7 | 8 |
|---|---|---|---|---|---|---|---|---|---|
| $M_i$ |  | 0110 | 0101 | 0100 | 1011 | 0001 | 0110 | 1001 | 0110 |
| $Q_i$ |  | 6 | 5 | 4 | 11 | 1 | 6 | 9 | 7 |
| $R_i$ | 1.7 | 2.5 | 2.9 | 2.1 | 1.2 | 2.2 | 1.9 | 2.6 | 2.0 |
| | $C'_0 = R_0(1 + 7.5K)$; $C'_i = R_i(1 + KQ_i)$ $K = 0.2$ | | | | | | | | |
| $C'_i$ | 4.25 | 5.5 | 5.8 | 3.78 | 3.84 | 2.64 | 4.18 | 7.28 | 4.8 |
| $b_i$ |  | 5 | 3 | 8 | 4 | 5 | 6 | 8 | 5 | 7 |
| $O_i$ |  | 2 | 0 | 7 | 1 | 3 | 5 | 8 | 4 | 6 |
| $C_i$ |  | 5.5 | 3.78 | 4.25 | 3.84 | 7.28 | 2.64 | 4.8 | 5.8 | 4.18 |

Figure 7:
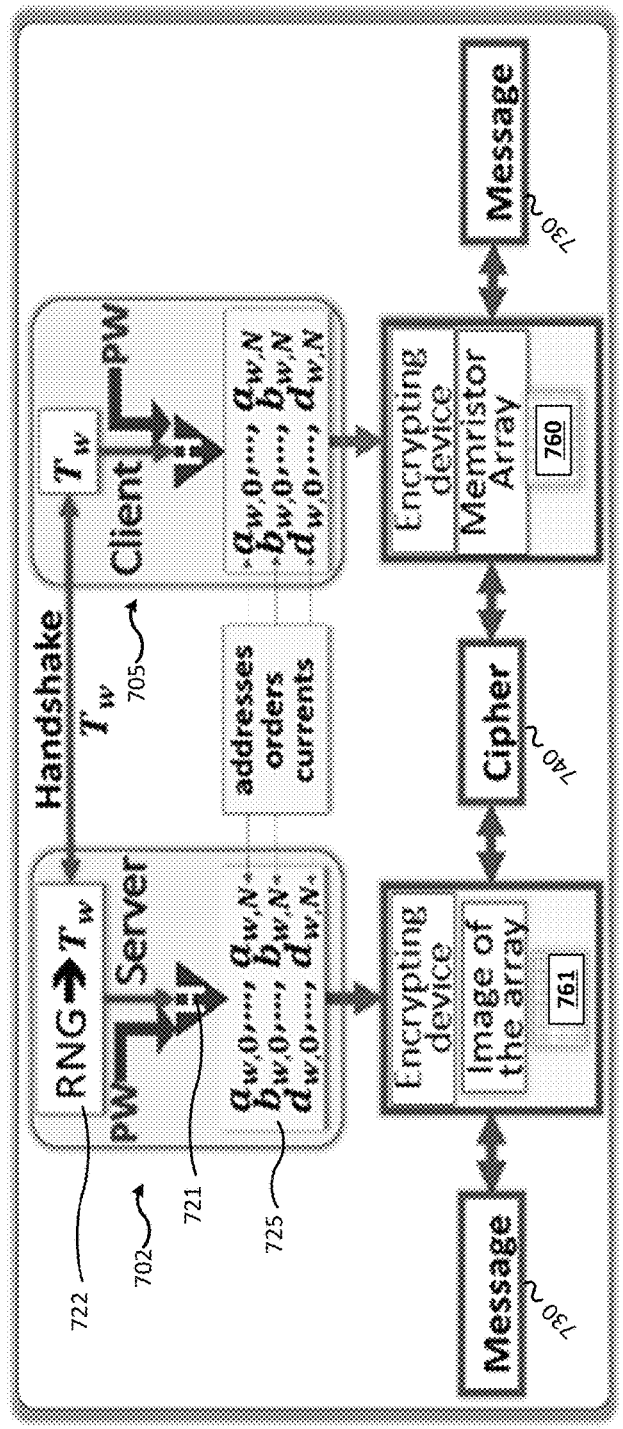
FIG. 7 is a block diagram of a client device with an addressable PUF generator (APGs), interacting with a server using a keyless PUF-enabled encryption scheme according to another embodiment.

The message M=01100101010010110001011010010111 is broken into the fragments $M_i$ shown. Each fragment $M_i$ is converted into a natural number $Q_i$. The resistances of the corresponding PUF devices are measured. In this example, the encoded fragment $C'_i$ for each message fragment is determined using the transformation shown which depends on the value of $Q_i$. In some embodiments, $Q_i$ is used to determine a parameter of the resistance measurement (e.g., an input current level associated with the measurement) as described above, in which case the encoded fragment may depend only on the appropriately measured resistance value. In other embodiments, measurement instructions may be extracted from the message digest analogously to the addresses and sequencing instructions as illustrated by FIG. 7 and described below. The values of the resistance, in M-ohm at the 9 cells selected by the set of addresses $a_i$ shown in the table are then ordered using the sequencing numbers $b_i$ and ordered in the sequence specified by re-ordering $O_i$ as described previously. Finally, the cipher C is converted into a digital stream and transmitted to the receiving party.

Figure 6:
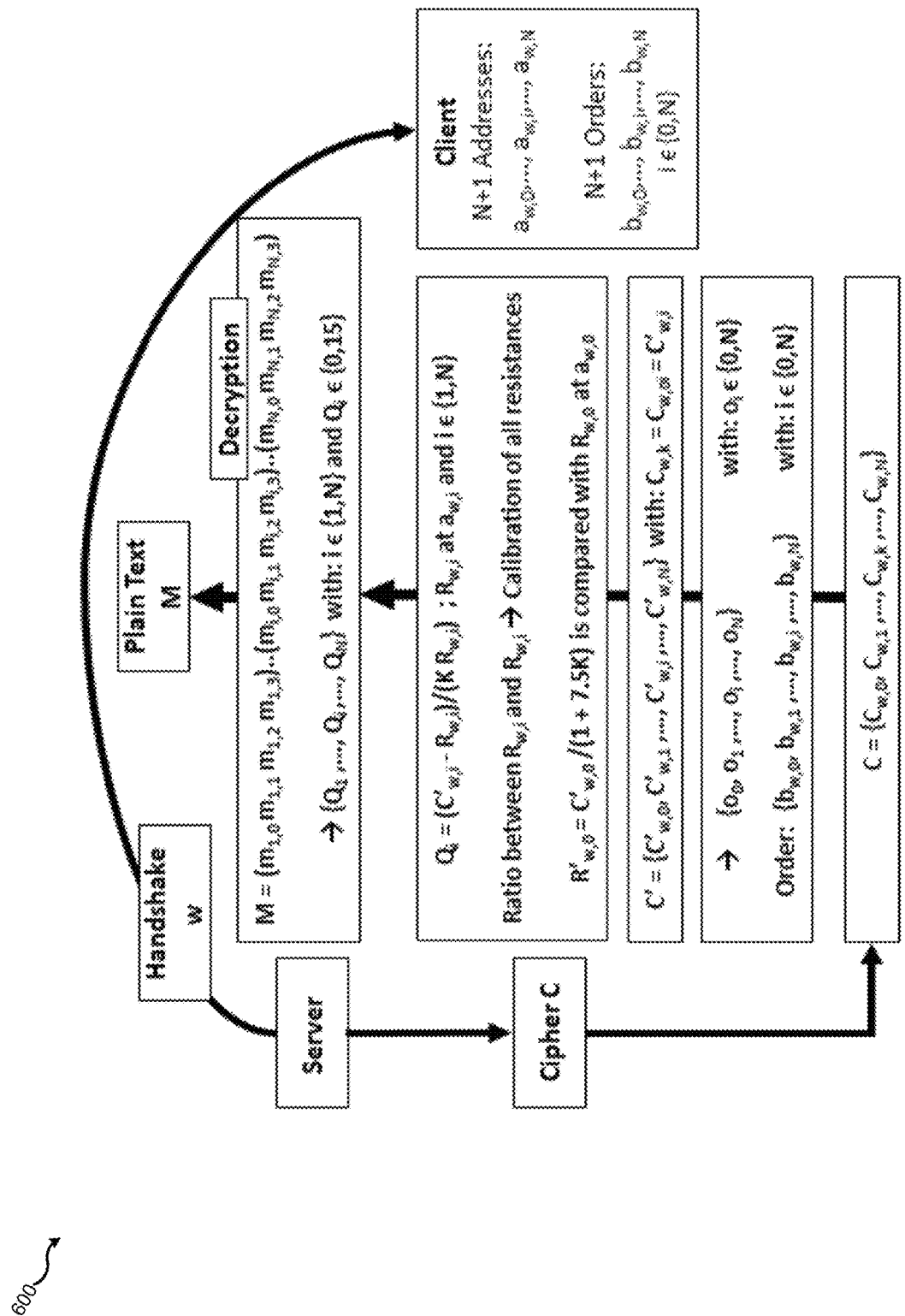
FIG. 6 is a flow diagram depicting a decryption procedure that may be practiced using the embodiment of FIG. 3.

FIG. 6 illustrates an analogous decryption procedure which operates according to similar principles as the encryption procedure described above with the exception that the transformation between the message fragments and the encoded fragments of FIG. 5 as described above is inverse to the decoding transformation of FIG. 6 (i.e., multiplication instead of division in this example). The server may decrypt a ciphertext received from the client using the appropriate challenge and device characteristics retrieved from a lookup table accessed by the server. Alternatively, a client may decrypt a ciphertext sent by the server using the same challenge and actively measuring the appropriate device characteristics.

As mentioned above, some characteristics of suitable PUF devices (e.g., memristor resistances, transistor channel resistances, and other characteristics) may be temperature dependent. Furthermore, there may be no guarantee that subsequent measurements of a given PUF device will occur at the same temperature as measurement values stored in an image of a PUF array accessed by a server. Accordingly, FIG. 6 shows a comparison between a reference value of a device characteristic (a resistance) included in a ciphertext generated by a client device, denoted $R'_0$ and the corresponding value $R_0$ measured previously. The freshly-measured resistance values extracted from the ciphertext may be transformed using the ratio of $R'_0$ to $R_0$ to compensate for temperature effects when the resistances measure vary linearly with temperature or another suitable transformation may be applied given knowledge of the temperature-dependent behaviors of a particular PUF technology.

FIG. 7 shows an embodiment 700 related to the embodiment of FIG. 3 in which a server 702 communicates with client 705. The server may issue a challenge 722 (represented by the random number $T_w$ for a particular Handshaking instance). Random number $T_w$ is preferably a true random number (TRN) generated by a TRN generator (RNG). The RNG may be located at the server, as shown, or a pair of synchronized RNGs may be located at the server and client respectively, which obviates the need for transmission of the TRN as part of the handshake.

Using the same hashing function 721 (e.g., one of the hashing functions described above in reference to FIG. 3), the server 702 and client 705 generate the instructions 725 in the form of a message digest MD which may be used for encryption or decryption as previously described using measurements of characteristics of the devices belonging to the PUF array 760 or the previously-measured characteristics stored in the image 761 of the PUF array 760 accessed by the server 702. The server 702 or client 705 may use the instructions 725 to encrypt a message 730 or decrypt a ciphertext 740 to retrieve the message 730 as previously described. The instructions 725 of embodiment 700 differ from the instructions 325 of embodiment 300 in that, in addition to addresses $\{a_0 \ldots a_n\}$ and sequencing values $\{b_0 \ldots b_n\}$, the instructions 725 include an additional set of measurement parameters, $\{d_0 \ldots d_n\}$ (represented in FIG. 7 as input current levels used for measurements of memristor devices of the PUF array 760). Just as the addresses identify the PUF devices to measure and the sequence values are used to determine how to arrange portions of the ciphertext 740 derived from those PUF devices and the message 730, the measurement parameters identify the measurement conditions the client 705 will use for the corresponding PUF device. The measurement parameters similarly identify which measurements of a given PUF device the sever 702 will retrieve from the image 761 of the PUF array 760 storing previous measurements of each PUF devices conducted under various conditions (e.g., a set of resistance values for each PUF device where each resistance values corresponds to particular input current level).

Figure 8:
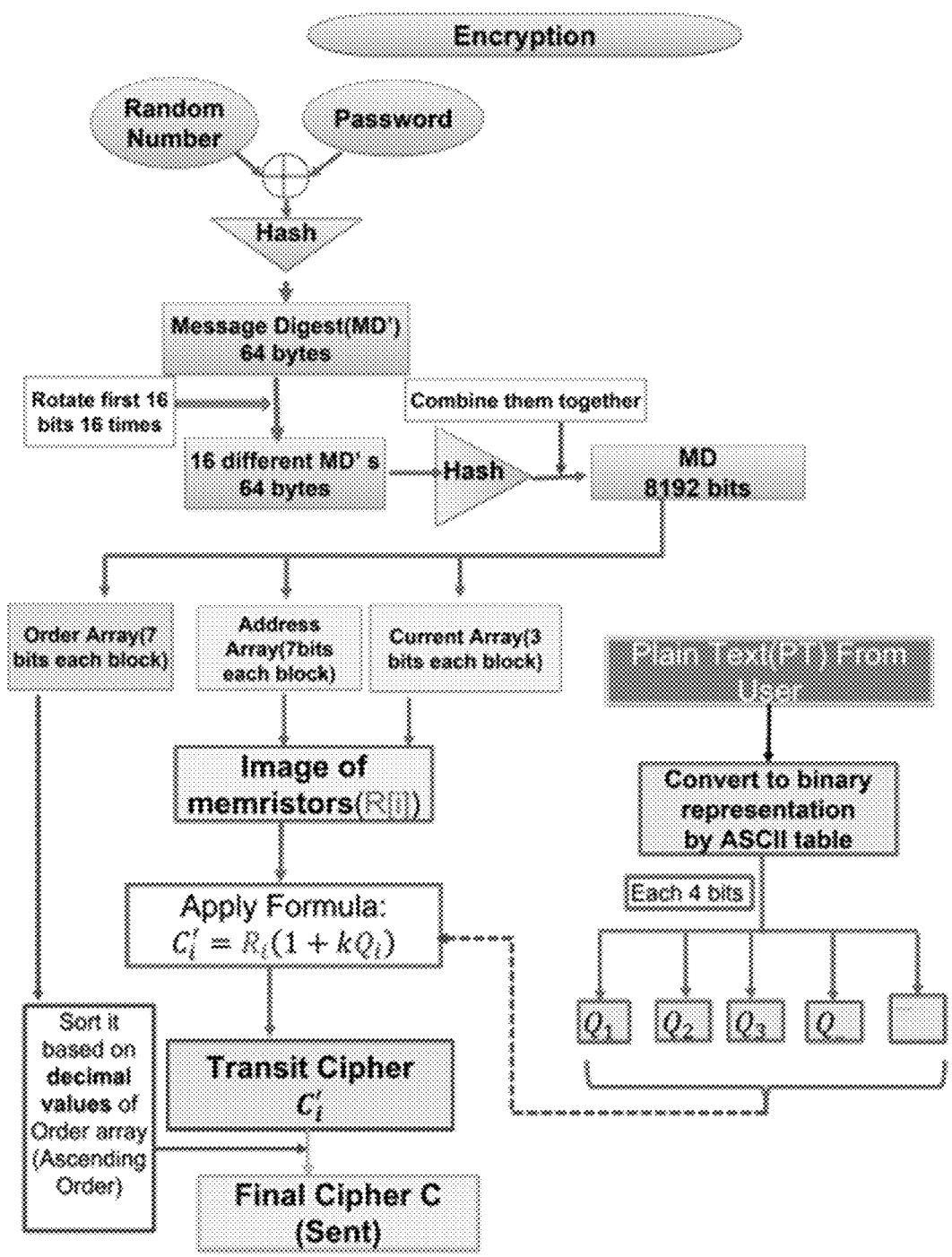
FIG. 8 depicts a flowchart detailing the encryption process using a memristor PUF.

FIG. 8 illustrates steps of a method for keyless encryption using the arrangement of FIG. 7. Generally speaking, a hash function output is divided to three chunks of the addresses, orders, and currents. The addresses and currents are used to determine a particular cell and to measure (or retrieve from an imaged PUF) the resistance of memristors specified in the addresses. The orders the orders are used to reorder the cipher text. The plaintext (i.e., the message) is split into several message symbols and these symbols are encrypted using memristors resistance values to generate the final cipher text.

Walking through the protocol of FIG. 8 in more detail, a password (PW) and random number (RN) are accessed by a device, e.g., a client device that is to encrypt a message. As illustrated in FIG. 7, it is contemplated that the PW will be independently accessible to each of the communicating devices, and the RN will be transmitted from one device to the other as part of the handshake procedure, or will be independently generated in parallel, as with synchronized RNGs. The PW and RN are XORed and then hashed to get a message digest (MD). An expanded long message digest (LMD) is generated from the MD. One method for accomplishing this is set forth above in relation to FIG. 4. Alternatively, the MD may be circularly shifted and sent to the hash function multiple times, and the results concatenated to act as an extended output function (XOF) to generate the long message digest (LMD). This LMD is divided into address, current and order arrays. For encrypting, the plaintext in ASCII is divided into 4-bit symbols, whose decimal equivalent ranges from 0 to 15. Each symbol is combined with a resistance value extracted from the original response at a particular cell (or measured from the PUF, in the case of client side encryption) when a certain current is injected, according to the values extracted from the LMD (address and current). This combination occurs by application of the formula shown in FIG. 8: $C'_i = R_i(1 + kQ_i)$. The order array is used to shuffle the resulting cipher ($C'_i$) obtained from different symbols to add another layer of confusion for the hacker.

Figure 9:
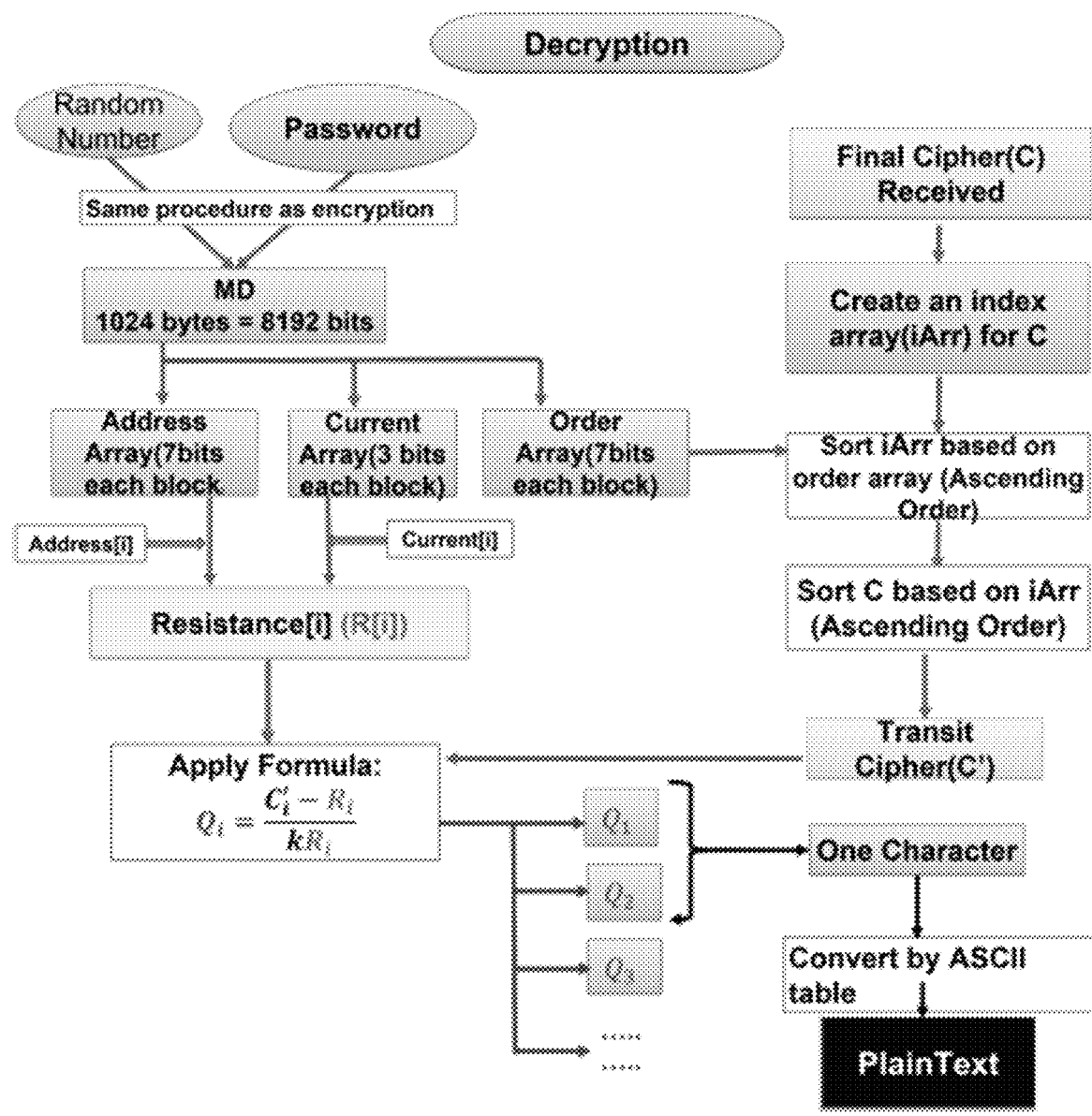
FIG. 9 depicts a flowchart detailing the decryption process using a memristor PUF.

FIG. 9 shows the steps of a method of decrypting a message encrypted according to the method shown in FIG. 8. In the decryption method, a receiving device (the client or the server) generates the same message digest according to the same process steps as the sending device by hashing a TRN and the shared password. The TRN may have been shared with the receiving device as part of the handshake procedure, or it may be independently generated in parallel. The receiving device produces the same expanded LMD according the methods disclosed above, and divides the LMD into address, current and order arrays or blocks, according to the same methods described above. Thus, the receiving device the same blocks for addresses, orders, and currents that were used to generate the ciphertext. The receiving device and has the cipher text and knows which resistance should be used to retrieve the blocks of plaintext. The receiving device uses this information to extract memristor resistance values (either by measuring the PUF or by retrieving the previously measured values from the image depending on whether the device is the "server" or the "client" as shown in FIG. 3).

The receiving device also uses the order blocks from the LMD to correctly reorder blocks of the received cipher text message. This is done according to the procedure shown in FIG. 9. The receiving device receives the encrypted ciphertext, creates an index array for the received ciphertext C, sorts the index array based on the Order Array generated from the order information in the LMD (e.g., in ascending order), and then sorts the blocks of ciphertext C on the basis of the Order Array.

Once the ciphertext has been correctly ordered, the measured or received resistance values are used to decrypt the ciphertext according to the formula shown in FIG. 9. The resulting ordered, decrypted blocks are then concatenated and converted to ASCII to result in plaintext.

As was discussed above, a preferred PUF used in the above embodiments is a memristor-based ReRAM PUF. As PUFs are sensitive to environmental factors like temperature, the response of the memristor may change over time or when measured under conditions (e.g., temperatures) different from those at which the PUF was originally characterized during enrollment. Generally, memory-based PUFs may have cell-to-cell and array-to-array variations of the resistances and current values due to changes in the temperature. Under different temperatures, the same cells under the same currents give different resistances. Also, reading the cell resistance alone will be different when the same cell is read with a group of cells. Having any error from reading the memristors may cause failure to retrieve the blocks of plaintext.

These changes or drift may be conceived of as noise added to measurements of a PUF response. This means that if the message is encrypted using the PUF image i.e., the original PUF response (as shown in FIG. 8), the keyless protocol may not be able to extract the plaintext from the cipher using noisy PUF measurements, that is, measurements of a PUF taken under different conditions. The converse problem may also occur, a device in possession of the PUF image may not be able to decrypt a message encrypted with noisy PUF measurement data. To address these problems, error correction codes such as Reed Solomon RS or BCH codes may be used with the methods herebefore described.

ECC may be used to correct a received message which travels through a communication channel. For this purpose, parity bits are added as extra information to the message bits and then transmitted along the communication channel. With the advancement of time, many ECC have been introduced which are able to correct long messages with greater efficiency. These schemes are generally complex end require more power and advanced hardware. These mechanisms are also efficient when they are utilized with a larger number of message bits. When used for short blocks of message they tend to not deliver desirable results. As an alternative to such ECC, inventive embodiments use simpler error correction mechanisms such as Reed Solomon and BCH codes for the protocols described herein. These simple mechanisms are less hardware intensive and are better suitable for short message blocks.

Reed Solomon codes are a group of error correction codes that operate on a block of data treated as a set of finite field elements called symbols. Reed-Solomon codes can detect and correct multiple symbol errors. By adding t check symbols to the data, a Reed-Solomon code can detect (but not correct) any combination of up to and including t erroneous symbols or locate and correct up to and including $$\left[\frac{t}{2}\right]$$

erroneous symbols at unknown locations. As an erasure code, RS can correct up to and including t erasures at locations that are known and provided to the algorithm, or it can detect and correct combinations of errors and erasures. Reed Solomon codes are also suitable as multiple-burst bit-error correcting codes since a sequence of b+1 consecutive bit errors can affect at most two symbols of size b. The choice of t is up to the designer of the code and may be selected within wide limits.

There are two basic types of RS codes, original view and Bose Chaudhuri Hocquenghem codes (BCH) view, with BCH view being the most common as BCH view decoders are faster and require less working storage than original view decoders. The BCH codes form a class of cyclic error-correcting codes that are constructed using polynomials over a Galois field. Cyclic error-correcting codes means that a block code, where the circular shifts of each codeword gives another word that belongs to the code.

ECCs may be used, according to certain embodiments, to correct the errors introduced during either the encryption or decryption phase of the protocols described above. Dealing with errors induced during the decryption phase will first be described. For the purposes of this discussion, the response of a memristor, which may be noisy due to temperature, drift and the other effects described above, is used to decrypt a message that has been encrypted using data stored in a PUF image. In these cases, as above, the message or plaintext is encrypted using to its ASCII equivalent divided into 4-bit symbols, $Q_i$, and converted into its decimal format whose values ranging between 0 to 15. Initially, these values were directly used in Equation 1, along with address, current and order arrays, to extract a cipher text. As discussed previously, the PUF responses are noisy, leading to a noisy decrypted message. Here, ECCs are used to detect and correct the erroneous message.

$$C_i = R_i(1 + K + Q_i) \qquad \text{(Equation 1)}$$

Figure 10:
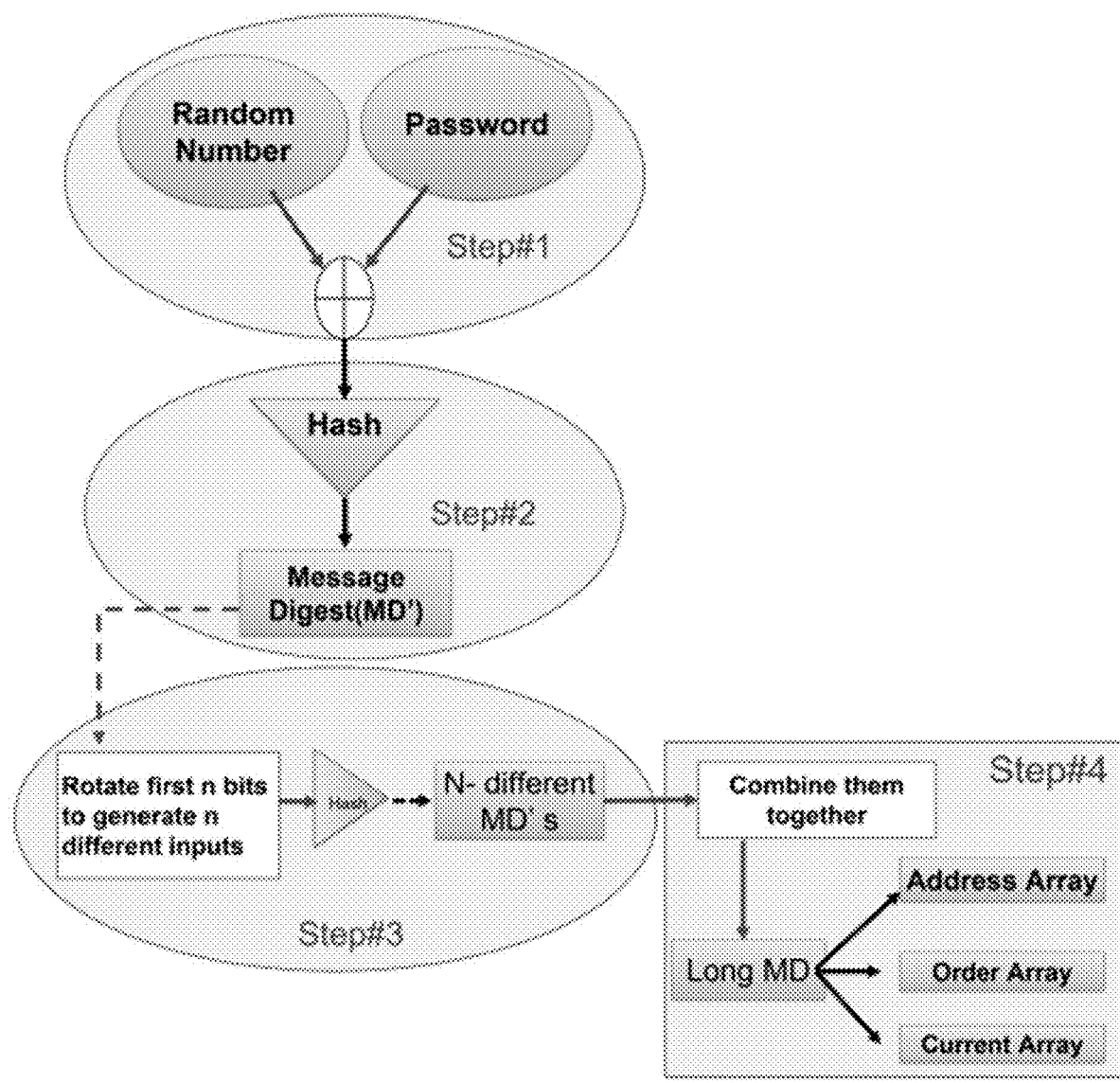
FIG. 10 depicts a flowchart detailing the extraction of address, order, and current arrays from a long message digest (LMD).

Using the concepts of APGs, the message digest is initially calculated as shown in Step 1 and 2 of FIG. 10. In this protocol, a random number is XORed with a password which is shared information between the client and the server. The output is sent to a SHA-512 function to extract a message digest.

The extraction of long message digest (LMD) from the message digest extracted in Steps 1 and 2 is shown in Step 3 of FIG. 9. A circular shift mechanism is employed to the message digest n times and the first n bytes of the circular shifted output is hashed with a SHA-512 to extract 512*n=N bits of the long message digest.

In FIG. 10, Step 4 shows the conversion of the LMD into address, current, and order block arrays. N bits are divided into blocks of 16 bits in length. The first 7 bits of each block refer to the address of the cell in the PUF from which the parameter (resistance) is to be read. The next 3 bits refer to the current applied at the chosen cell to read the parameter and applying Equation 1. These bits (address and current) are used to extract the PUF measurement data (i.e., resistance values) used in Equation 1 from either the PUF itself (by contemporaneous measurement) or the PUF image (previous measurements) depending on which device is encrypting the message. The next 6 bits refer to the order of the cell. This order value is taken for all message symbols and reordered in ascending order of the order array extracted from LMD.

Figure 11:
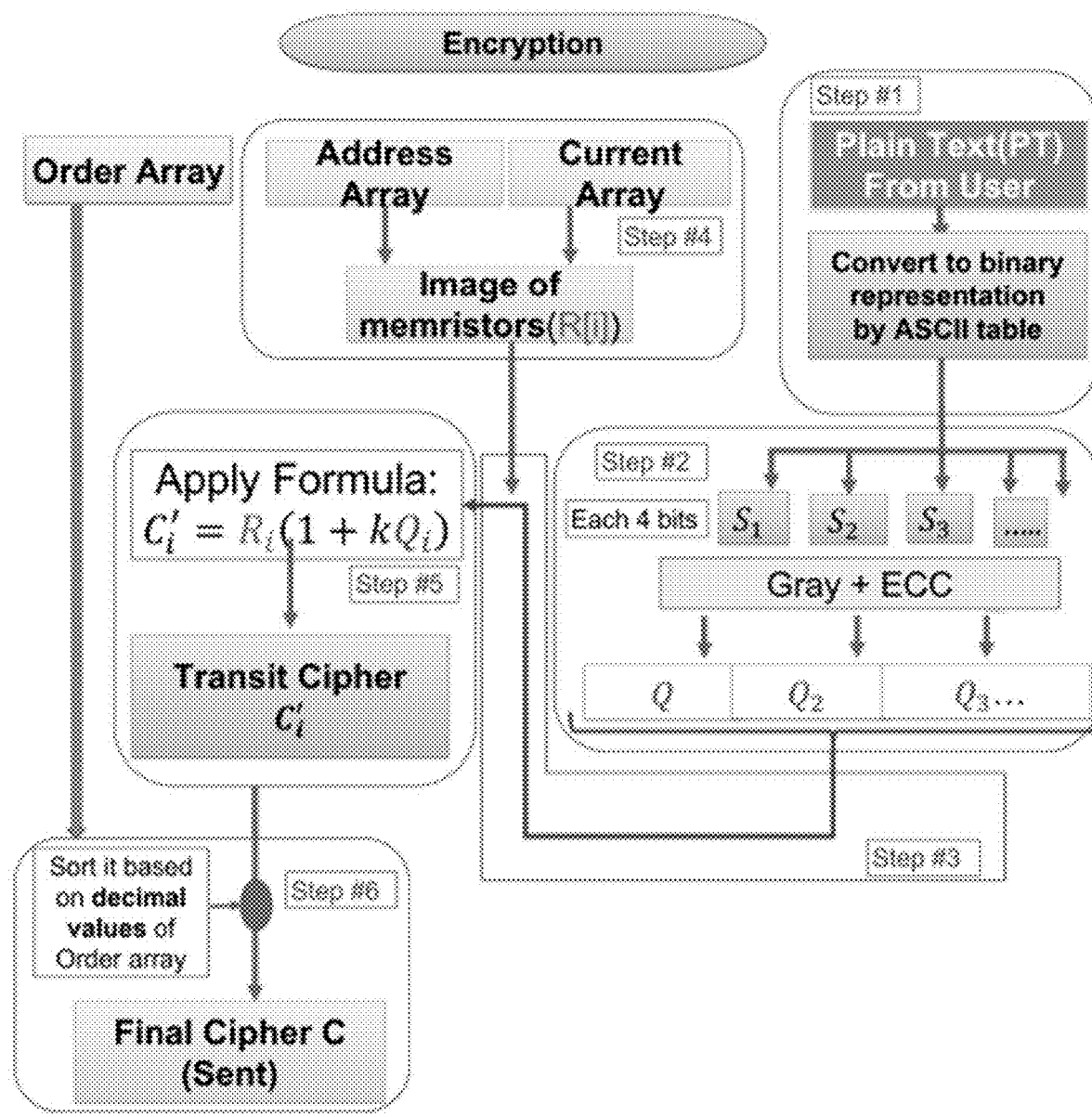
FIG. 11 depicts a flowchart detailing the improved keyless encryption protocol with ECC.

Referring now to FIG. 11, there is shown a method for inclusion of ECC in a message during encryption. In Step 1 of FIG. 11, the plaintext is first divided into 4-bit symbols $S_i$ from its ASCII equivalent. These message symbols are then optionally converted into Gray code format before encoding them using ECC. The message symbols are encoded using block encoding techniques of an ECC encoder to add parity message bits to each message block (collection of symbols) as shown in Step 2 of FIG. 6. The ECC block allows extraction of the message when noise is introduced in the decryption phase of the protocol. This encoded message acts like the plaintext which is then encrypted as normal the keyless protocol.

Still referring to FIG. 11, Step 3 shows the encapsulation of the message with the PUF resistance data (in this case, resistance data retrieved from the PUF image, as when the server device of FIG. 3 is encrypting the message) to generate a cipher text. Here, $Q_i$ refers to each encoded message symbol whereas $R_i$ refers to the resistance extracted from a cell address (A) at a current ($Cr_i$) (FIG. 11, Step 4). K is a constant number so Equation 1 can be applied to obtain Transit Ciphers, $C'_i$. After extracting transit cipher from each message block, they are reordered based on the order of the block in ascending order and sent to the client as final cipher, as shown in FIG. 11, Step 6.

Figure 12:
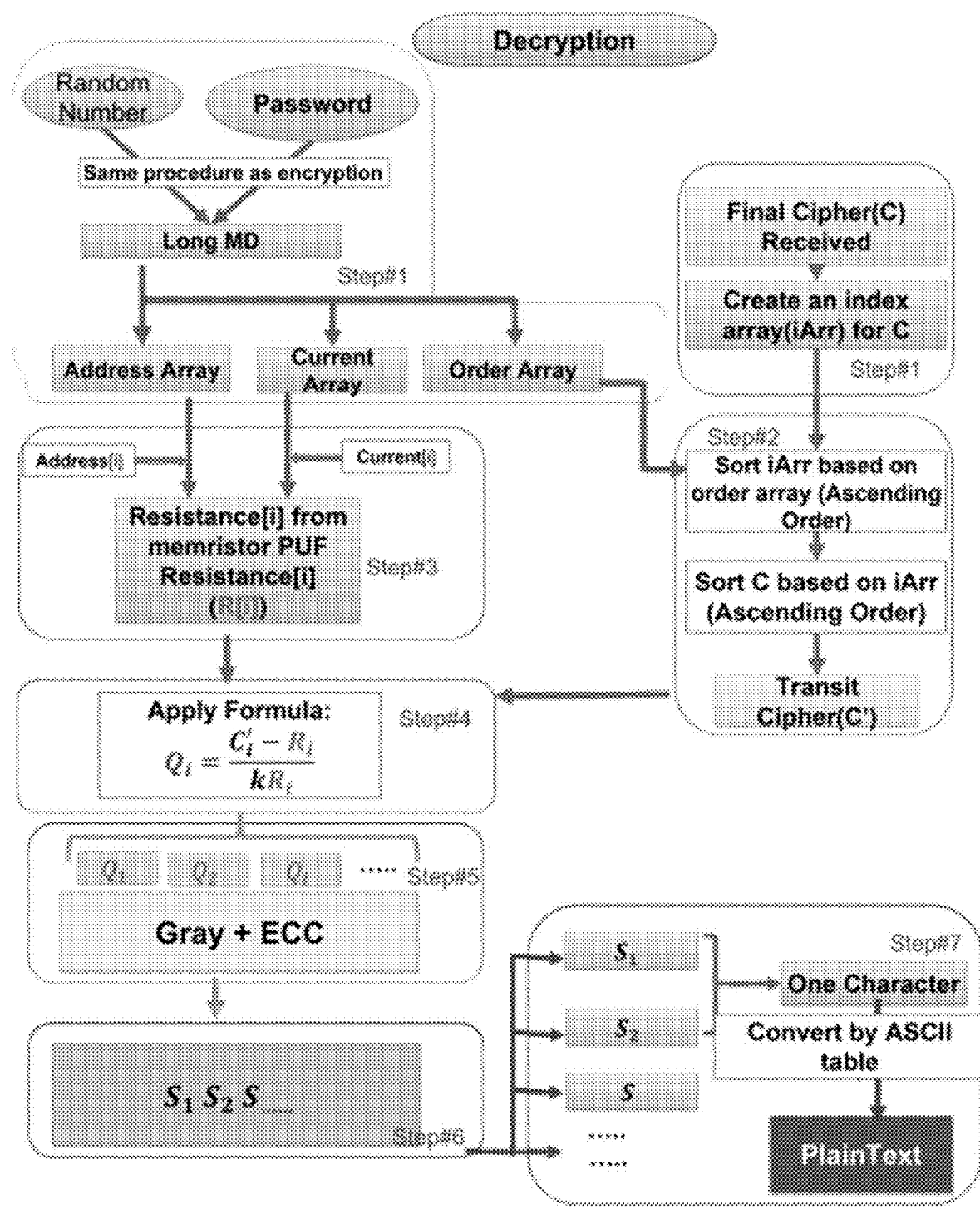
FIG. 12 depicts a flowchart detailing the improved keyless decryption protocol with ECC.

FIG. 12 shows the decryption phase of the message from the received cipher by the client device. Recall, the password and random number are shared information (in independently generated information) and the client has access to the PUF device. Using the APG protocol, a message digest is extracted from which LMD is obtained. The address, current, and order arrays are derived from the long message digest by dividing it into blocks of length 16-bits. Also, in decryption Steps 1 and 2, the final cipher $C_i$ is de-shuffled to obtain back the transit cipher C using the order array.

The resistance value R from the PUF device is extracted at a certain cell address (A) when a particular current ($Cr_i$) is applied for the ReRAM cell "i". These extracted resistance values may be noisier versions of the resistances extracted on the server end from where the message was transmitted. Using the decryption formula Equation 2 (below), the encoded message $Q_i$ is extracted (FIG. 12, Steps 3 and 4).

$$Q_i = \frac{C'_i - R_i}{KR_i} \qquad \text{(Equation 2)}$$

The extracted encoded blocks are noisy versions of the encoded message, conceptually similar to a message sent through a noise communication channel. These noisy encoded blocks, $Q_i$, are applied to an error correction decoder to extract $S_i$ which is used obtain the plaintext message.

In the examples set forth in FIGS. 11 and 12, the encrypting device is described as the server device, which has access to the PUF image, and the PUF image data is used to encrypt the ECC encoded message fragments. The decrypting device is described as the client device, which uses contemporaneously measured response data from the PUF itself to decrypt the message, and then apply ECC decoding to the fragments. But this arrangement is not a requirement.

The reverse arrangement, where the encrypting device is the client device, which encrypts on the basis of measured PUF responses and the decrypting device is the server, which decrypts on the basis of PUF image data is allow possible and fully within the scope of the invention.

The protocol described above has been implemented using one real data set of resistance measured from 128 cells of a ReRAM at 8 different currents (100 nA; 200 nA, 800 nA) which were augmented with induced Additive White Gaussian Noise with different power resulting in different signal to noise ratios (SNRs) to simulate different responses of the ReRAM PUF under various environmental conditions. With access to only a single read of the same cell of ReRAM at different currents, the noise was simulated by assuming a Gaussian distribution for noise. Based on the resistance value of 128 cells at a current, the mean and variance were calculated when the noise is added to the resistance values. This experiment was repeated 1,000 times, and the noise was randomly selected each time based on the SNR.

The disclosed protocol was followed to start the encryption. Once a LMD of 8192 bits was extracted, it was divided into current, address, and order arrays of 3, 7, 6 bits, respectively. These numbers were selected based on the data extracted. Specifically, 3 bits were used to address the 8 different current values, and 7 bits were used to address the 128 different cells. To allow equal number of bits for every block without padding, 6 bits were used to get an order number to shuffle the bits. It is anticipated that these numbers would change depending on the value of cell resistances, but this will not affect the results of the protocol. Reed Solomon codes were used initially in the testing. A 21-symbol message was encoded using blocks coding techniques and added parity symbols for every block of symbols. A RS (N=15, K=7) was used which has a capability to correct 4 symbols as the ECC block. Therefore, for every 7 message symbols in a block, 15 symbols of encoded message block were extracted, totaling 45 encoded symbols for 21 message symbols. These 45 encoded symbols were then encrypted using Equation 1. A cipher consisting of 45 $C_i$ was sent to the receiver.

On the receiver end, the 45 $C_i$ was used in the keyless decryption protocol. The decrypted 45 $C_i$ gave 45 $Q_i$. These decrypted $Q_i$ was sent to a RS (N=15, K=7) decoder, where each 15 $Q_i$ symbols extracted 7 message symbols, thereby extracting 21 message symbols in total from the 45 $Q_i$.

The RS codes were able to correct all the message errors when they were in the correction capability of the RS codes. When the number of errors is higher than the codes capability, the symbol error ratio (SER) follows the trend where the SER decreases with the increase in SNR (noise injected decreases as SNR increases). With the optional inclusion of Gray codes, a considerable improvement may be obtained in the bit error rate.

Figure 13:
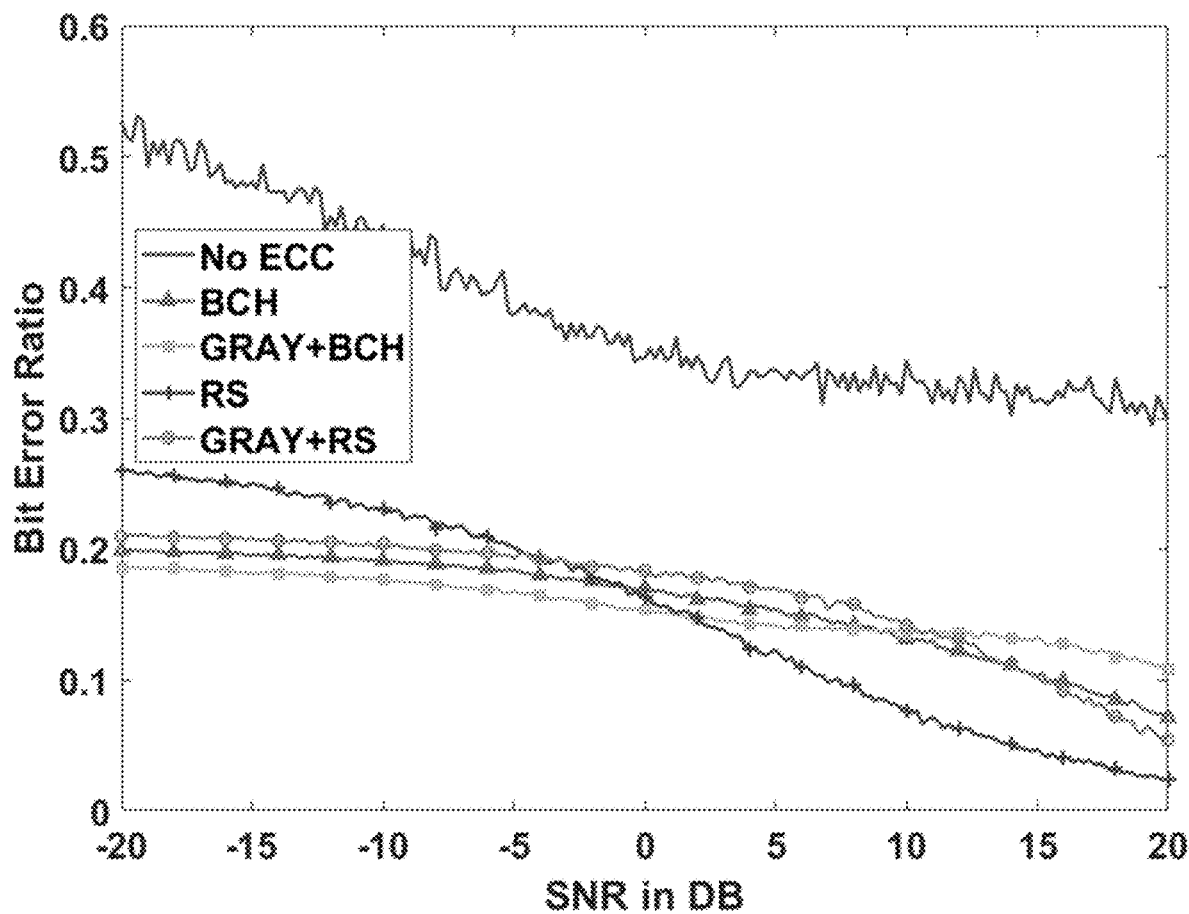
FIG. 13 depicts a comparison of bit error ratio between the improved protocol with BCH and RS and the original protocol.
Figure 14:
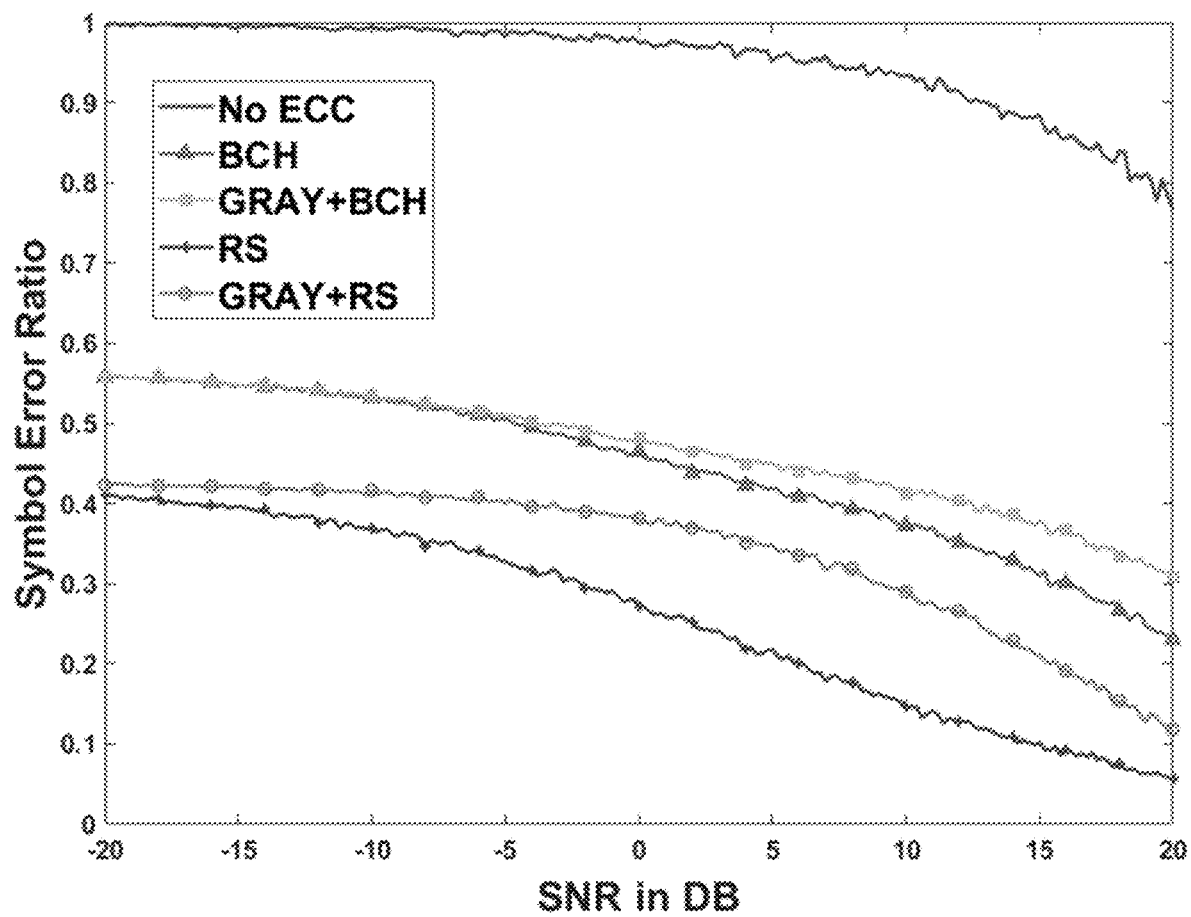
FIG. 14 depicts a comparison of symbol error ratio between the improved protocol with BCH and RS and the original protocol.

The same protocol was also implemented using BCH (N=63 bits/16 symbols, K=30 bits/7 symbols) code to test the performance of BCH in a Keyless Protocol setting. We had to pad the message bits to match the BCH message length logistics. The data for the aforementioned tests plotted in FIGS. 13 and 14, which show BER and SER, respectively, for various combinations of encoded data.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

The exemplary structures disclosed herein are for illustrative purposes and are not to be construed as limiting. In addition, variations and modifications can be made on the aforementioned structures without departing from the concepts of the present invention and such concepts are intended to be covered by the following claims unless these claims by their language expressly state otherwise.

The invention claimed is:

1. A system, comprising a processor, and memory coupled to the processor, the memory storing:
   (a) device characteristics of a physical-unclonable-function ("PUF") array belonging to a client device and having a plurality of PUF devices, each device characteristic associated with a physical measurement of a PUF device belonging to the PUF array;
   (b) executable instructions that, when executed by the processor, cause the processor to:
      receive a message and processing instructions;
      extract a set of addresses and a set of corresponding sequence values from the processing instructions; and
      generate a transformed string by:
         dividing the message into message fragments and associating each message fragment with an address and its corresponding sequence value;
         encoding each message fragment with error correction codes resulting in encoded message fragments;
         for each encoded message fragment, retrieving, from the memory, a corresponding device characteristic identified by the associated address;
         generating transformed fragments representing each message fragment with a value determined by a function of the value of that message fragment and the corresponding device characteristic; and
         concatenating the transformed fragments in an order derived from the set of corresponding sequence values.

2. The system of claim 1, wherein the memory stores further instructions that, when executed by the processor, cause the processor to:
   transmit a seed value to a client device;
      generate the processing instructions by converting the seed value into a message digest using a hashing function;
      receive, as the message, a ciphertext from the client device.

3. The system of claim 2, wherein the seed value includes a random number.

4. The system of claim 3, wherein converting the seed value into a message digest using a hashing function comprises hashing the random number and a password.

5. The system of claim 1, wherein retrieving the corresponding device characteristic for each message fragment comprises selecting a measurement of the corresponding device characteristic associated with a measurement condition determined by the value of that message fragment.

6. The system of claim 1, wherein encoding each message fragment with error correction codes resulting in encoded message fragments comprising encoding each message fragment in accordance with one of RS or BCH encoding.

7. A system, comprising:
   a processor, a physical-unclonable-function ("PUF") array of PUF devices, and memory coupled to the processor, the memory storing instructions that, upon execution by the processor, cause the processor to:

receive deciphering instructions and a ciphertext;

extract, from the deciphering instructions, a set of addresses and a corresponding set of sequence values;

divide the ciphertext into ciphertext fragments, each ciphertext fragment associated with an associated address and an associated sequence value, each associated address identifying a PUF device belonging to the PUF array;

retrieve a plaintext by performing a deciphering procedure that comprises:

measuring, for each ciphertext fragment, a characteristic of the associated PUF device for that ciphertext fragment identified by the associated address for that ciphertext fragment;

deriving, for each ciphertext fragment, a decrypted fragment for using the measured characteristic of the associated PUF device;

applying an error correction code decoding procedure to each of the decrypted fragments resulting in decoded fragments; and concatenating the decoded fragments in an order derived from the corresponding set of sequence values extracted from the deciphering instructions.

8. The system of claim 7, wherein each PUF device belonging to the array of PUF devices has a non-linear transfer function relating inputs to the device to outputs of the device; and wherein measuring the characteristic of the associated PUF device for each ciphertext fragment comprises measuring a value of the non-linear transfer function of the associated PUF device for that ciphertext fragment; and wherein deriving the decrypted fragment for each ciphertext fragment comprises applying a mathematical function to characteristic of the associated PUF device for that ciphertext measured at an input level determined by a value of that ciphertext fragment.

9. The system of claim 8, wherein the non-linear transfer function of the corresponding PUF device comprises measuring at least one the following of the corresponding PUF at a selected input level:
an electrical resistance;
a capacitance;
an inductance;
a current; and
a voltage.

10. The system of claim 7, wherein the memory stores instructions that, upon execution by the processor, cause the processor to:

extract, from the deciphering instructions, a set of measurement conditions under which to measure a characteristic of the associated PUF device for that ciphertext fragment identified by the associated address for that ciphertext fragment.

11. The system of claim 10, wherein set of measurement conditions is a set of measurement currents.

12. The system of claim 7, wherein applying an error correction code decoding procedure to each of the decrypted fragments resulting in decoded fragments comprises decoding each of the decrypted fragments in accordance with one of RS or BCH decoding.

13. The system of claim 7, wherein the deciphering instructions include a random number.

14. The system of claim 13, wherein extracting, from the deciphering instructions, a set of addresses and a corresponding set of sequence values includes hashing the random number and a password.

15. A system, comprising:
a processor, a physical-unclonable-function ("PUF") array of PUF devices, and memory coupled to the processor, the memory storing instructions that, upon execution by the processor, cause the processor to:

receive a message and processing instructions;

extract a set of addresses and a set of corresponding sequence values from the processing instructions; and generate a transformed string by:

dividing the message into message fragments and associating each message fragment with an address and its corresponding sequence value;

encoding each message fragment with error correction codes resulting in encoded message fragments;

for each encoded message fragment, measuring a device characteristic in a device in the array of PUF devices having the associated address;

generating transformed fragments representing each message fragment with a value determined by a function of the value of that message fragment and the corresponding device characteristic; and concatenating the transformed fragments in an order derived from the set of corresponding sequence values.

16. The system of claim 15, wherein each PUF device belonging to the array of PUF devices has a non-linear transfer function relating inputs to the device to outputs of the device; and wherein measuring the characteristic of the associated PUF device for each ciphertext fragment comprises measuring a value of the non-linear transfer function of the associated PUF device for that ciphertext fragment; and wherein deriving the decrypted fragment for each ciphertext fragment comprises applying a mathematical function to characteristic of the associated PUF device for that ciphertext measured at an input level determined by a value of that ciphertext fragment.

17. The system of claim 16, wherein the non-linear transfer function of the corresponding PUF device comprises measuring at least one the following of the corresponding PUF at a selected input level:
an electrical resistance;
a capacitance;
an inductance;
a current; and
a voltage.

18. The system of claim 15, wherein the memory stores instructions that, upon execution by the processor, cause the processor to:

extract, from the deciphering instructions, a set of measurement conditions under which to measure a characteristic of the associated PUF device for that ciphertext fragment identified by the associated address for that ciphertext fragment, wherein set of measurement conditions is a set of measurement currents.

19. The system of claim 15, wherein encoding each message fragment with error correction codes comprises encoding each of the message fragments in accordance with one of RS or BCH encoding.

* * * * *